US012099315B2

(12) United States Patent
Hara et al.

(10) Patent No.: US 12,099,315 B2
(45) Date of Patent: Sep. 24, 2024

(54) IMAGE FORMING APPARATUS

(71) Applicant: CANON KABUSHIKI KAISHA, Tokyo (JP)

(72) Inventors: Jun Hara, Kanagawa (JP); Mikihiko Hamada, Kanagawa (JP); Shuichi Tetsuno, Kanagawa (JP); Toshihiko Takayama, Kanagawa (JP); Shinsuke Kobayashi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/476,841

(22) Filed: Sep. 28, 2023

(65) Prior Publication Data

US 2024/0019796 A1 Jan. 18, 2024

Related U.S. Application Data

(62) Division of application No. 18/081,943, filed on Dec. 15, 2022, now Pat. No. 11,815,827.

(30) Foreign Application Priority Data

Dec. 16, 2021 (JP) ................................ 2021-204609
Dec. 20, 2021 (JP) ................................ 2021-206397

(51) Int. Cl.
*G03G 15/08* (2006.01)
*G03G 15/00* (2006.01)
*G03G 21/00* (2006.01)

(52) U.S. Cl.
CPC ..... *G03G 15/0815* (2013.01); *G03G 21/0035* (2013.01); *G03G 21/0064* (2013.01);
(Continued)

(58) Field of Classification Search
CPC ........... G03G 15/0815; G03G 15/5004; G03G 15/5037; G03G 21/0035; G03G 21/0064;
(Continued)

(56) References Cited

U.S. PATENT DOCUMENTS 5,294,964 A 3/1994 Oshiumi
7,343,109 B2 3/2008 Nishimura
(Continued)

FOREIGN PATENT DOCUMENTS

JP H05-165378 A 7/1993
JP H09-325607 A 12/1997
(Continued)

*Primary Examiner* — Joseph S Wong
(74) *Attorney, Agent, or Firm* — Venable LLP

(57) ABSTRACT

An image forming apparatus includes a photosensitive member, a charging member, an exposing device, a developing device, a transfer member, a brush, a voltage applying portion, and a control portion controlling a surface potential of the photosensitive member at the brush contacting position. When a value of subtracting a value of the surface potential of the photosensitive member in the brush contacting position from a value of the brush voltage is defined as a contacting position potential difference, the control portion controls the surface potential of the photosensitive member in the brush contacting position so that the contacting position potential difference is changed from a first potential difference to a second potential difference in a predetermined direction which is either one of an increasing direction or a decreasing direction, and then the contacting position potential difference is changed from the second potential difference to a third potential difference in the predetermined direction.

11 Claims, 17 Drawing Sheets

(52) U.S. Cl.
CPC ..... *G03G 21/0082* (2013.01); *G03G 15/5004* (2013.01); *G03G 15/5037* (2013.01); *G03G 2221/0015* (2013.01); *G03G 2221/0042* (2013.01); *G03G 2221/0073* (2013.01)

(58) Field of Classification Search
CPC ....... G03G 21/0082; G03G 2221/0015; G03G 2221/0042; G03G 2221/0073
See application file for complete search history.

(56) References Cited

U.S. PATENT DOCUMENTS

| | | | | |
|---|---|---|---|---|
| 11,397,400 | B2 | 7/2022 | Funatani et al. | |
| 11,526,116 | B2 | 12/2022 | Funatani et al. | |
| 2005/0226649 | A1 | 10/2005 | Sasai | |
| 2013/0315616 | A1 | 11/2013 | Ohno et al. | |
| 2015/0063887 | A1* | 3/2015 | Asaoka | G03G 21/105 399/353 |
| 2017/0075290 | A1 | 3/2017 | Hiramatsu et al. | |
| 2019/0041775 | A1 | 2/2019 | Hirado et al. | |
| 2022/0197175 | A1 | 6/2022 | Kabayashi et al. | |
| 2022/0197207 | A1* | 6/2022 | Funatani | G03G 21/0035 |

FOREIGN PATENT DOCUMENTS

| | | | |
|---|---|---|---|
| JP | H11-184244 | A | 7/1999 |
| JP | 2003-091181 | A | 3/2003 |
| JP | 2005-114754 | A | 4/2005 |
| JP | 2005-114755 | A | 4/2005 |
| JP | 2005-300686 | A | 10/2005 |
| JP | 2005-308902 | A | 11/2005 |

* cited by examiner

IMAGE FORMING APPARATUS

This is a divisional of U.S. patent application Ser. No. 18/081,943, filed Dec. 15, 2022.

FIELD OF THE INVENTION AND RELATED ART

The present invention relates to image forming apparatuses such as laser printers, copiers, and FAX apparatuses that use the electrophotographic method.

Image forming apparatuses using the electrophotographic method are widely used. In such image forming apparatuses, the process cartridge system is widely used, in which a photosensitive drum and process means that work with it are detachable from the main body of the apparatus.

In recent years, a cleaner-less system has been proposed for the purpose of downsizing the main body of the image forming apparatus and process cartridge (Japanese Laid-Open Patent Application No. 2003-91181). In a cleaner-less image forming apparatus, there is no dedicated cleaning unit that removes and collects residual transfer toner from the surface of the photosensitive drum that remains on the surface of the photosensitive drum after the transfer process. In the cleaner-less image forming apparatus, the residual transfer toner remaining on the surface of the photosensitive drum is removed from the surface of the photosensitive drum by a developing means during the developing process, is collected and reused (simultaneous cleaning during developing).

However, in the cleaner-less image forming apparatus, a cleaning unit that collects the residual transfer toner is not located downstream from the transfer portion and upstream from the charging portion in the rotation direction of the photosensitive drum. Therefore, the position on the photosensitive drum where paper dust adhered during the transfer process becomes insufficiently charged during the charging process, and image defects such as spotty toner loss during the development process may occur.

Therefore, a configuration in which a brush member (fixed brush) is placed downstream from the transfer portion and upstream from the charging portion in the rotation direction of the photosensitive drum to collect paper dust that adheres to the surface of the photosensitive drum during the transfer process has been proposed (Japanese Laid-Open Patent Application No. 2005-114754). Not only paper dust but also residual transfer toner and toner on the non-image portions of the photosensitive drum (fogging toner) accumulate on the brush member. If too much toner accumulates on the brush member, the brush member may not be able to hold the toner, and the toner may slip off the brush member and adhere to, for example, the charging member as a charging means, causing a charging failure.

In contrast, a voltage may be applied to the brush member to make it easier for the toner to slip through. However, even when the brush member is electrically conductive and voltage is applied to the brush member in this manner, toner is collected and accumulated on the brush member because the brush member is in substantially constant contact with the photosensitive drum. Therefore, in order to prevent excessive accumulation of toner on the brush member, it is necessary, for example, to periodically discharge toner from the brush member and clean them.

Further improvements are required with respect to the brush member used to collect paper dust. For example, it is required to support cleaning the brush member by discharging from the brush member both regular (normal) polarity (the main charging polarity of toner during the development process) and irregular polarity (opposite polarity of the regular polarity) toner. For example, when the potential difference between the voltage applied to the brush member and the surface potential of the photosensitive drum is varied to clean the brush member, a large amount of toner may adhere to the electrically charged member if a large amount of toner is instantaneously discharged from the brush member. For example, if toner adheres to the charging roller as a charging member, image defects may occur during the rotation cycle of the charging roller. Therefore, it is also required to address issues caused by toner discharged from the brush member by the cleaning operation of the brush member.

In addition, while the paper dust collection brush in cleaner-less apparatuses suppresses image defects due to the effect of paper dust collection, it may also induce image defects due to excessive toner accumulation. To give an example, the moment paper enters the nip portion between the transfer member and the drum (hereinafter referred to as "transfer nip portion") during feeding, the drum instantly shifts from a state in which it is in contact with the transfer member to which the transfer voltage is applied to a state in which paper with electrical resistance is nipped between the drum and the transfer member. As a result, the drum potential fluctuates in the transfer nip portion at the moment of paper entry. When the potential fluctuation portion passes through the brush opposing portion, the charged toner accumulated in the brush is discharged into the potential fluctuation portion on the drum. The discharged toner is transferred to the paper, which may cause image defects. Such image defects can be suppressed by controlling the potential difference between the brush and the drum by controlling the drum potential by controlling the potential of the transfer member, the brush voltage, or both. In other words, the occurrence of such defects can be suppressed by having the toner accumulated in the brush by these controls be discharged during a period of time when it does not affect the image.

For example, brush cleaning by controlling brush potential may not be possible if the brush voltage cannot be varied freely due to a common power source. In addition, from the viewpoint of downsizing and cost reduction, it is desirable that the longitudinal length of the transfer member be short (narrow width). In particular, when the longitudinal length of the transfer member is narrower than the width of the paper, it is expected to have the effect of preventing paper dust from the paper core from adhering to the drum because the paper core is not pressed against the drum by the transfer portion when the paper passes through the transfer portion. However, the length of the transfer member in the longitudinal direction must be wider than the image forming area in order to transfer the toner in the image forming area. When the longitudinal length of the transfer member is shortened for this effect, brush cleaning using the transfer member cannot be performed for the area exceeding the width of the transfer member. As a result, toner discharging and associated image defects may occur at brush edges that are not cleaned by the transfer portion.

Therefore, the purpose of the present invention is to improve the cleaning performance of a brush member positioned in contact with the photosensitive member. It is also an objective of the present invention to reduce the occurrence of image defects caused by the cleaning brush, while achieving downsizing and cost reduction in cleaner-less image forming apparatus.

SUMMARY OF THE INVENTION

The above-mentioned purpose is achieved with an image forming apparatus according to the present invention. In summary, the present invention is an image forming apparatus comprising: a rotatable photosensitive member; a charging member configured to electrically charge a surface of the photosensitive member at a charging portion; an exposing device exposing the surface of the photosensitive member electrically charged to light at an exposing position and configured to form an electrostatic latent image on the surface of the photosensitive member; a developing device supplying toner charged with a normal polarity to the electrostatic latent image of the surface of the photosensitive member at a developing position and configured to form a toner image on the surface of the photosensitive member; a transfer member configured to transfer the toner image on the surface of the photosensitive member to a transferred material at a transfer position; a brush contacting the surface of the photosensitive member at a brush contacting position downstream of the transfer position and upstream of the charging position with respect to a rotational direction of the photosensitive member; a voltage applying portion configured to apply a brush voltage to the brush; and a control portion configured to control a surface potential of the photosensitive member at the brush contacting position, wherein the toner remaining on the surface of the photosensitive member after transferring is collected by the developing device, and wherein when a value of subtracting a value of the surface potential of the photosensitive member in the brush contacting position from a value of the brush voltage is defined as a contacting position potential difference, the control portion controls the surface potential of the photosensitive member in the brush contacting position so that the contacting position potential difference is changed from a first potential difference to a second potential difference in a predetermined direction which is either one of an increasing direction or a decreasing direction, and then the contacting position potential difference is changed from the second potential difference to a third potential difference in the predetermined direction.

In order to solve the aforementioned issues, the present invention has the following configuration. An image forming apparatus comprising: an image bearing member; a charging means configured to electrically charge a surface of the image bearing member at a charging portion; an exposing means configured to expose a surface of the image bearing member to light to form an electrostatic latent image on the surface of the image bearing member electrically charged by the charging means; a developing means configured to develop the electrostatic latent image formed on the surface of the image bearing member with a developer and to form a developer image; an accommodating portion configured to accommodate the developer to be supplied to the developing means; a transfer means configured to transfer the developer image formed by the developing means to a recording material in a transfer portion; a contacting member provided upstream of the charging portion and downstream of the transfer position with respect to a rotational direction of the image bearing member and contacting the surface of the image bearing member in a first contacting portion; a first applying means configured to apply a charging voltage to the charging means; a second applying means configured to apply a developing voltage to the developing means; a third applying means configured to apply a contacting voltage to the contacting member; a pre-exposing means configured to expose the surface of the image bearing member downstream of the first contacting portion and upstream of the charging portion. and a control means configured to control to collect the toner remaining on the image bearing member without being transferred to the recording material by the transferring means to the accommodating portion via the developing means by controlling the developing voltage applied by the second applying means; wherein a section in which a potential difference is formed to generate electrostatic force which moves the developer charged with a normal polarity in the first contacting portion from the contacting member toward the image bearing member is provided during an operation of non-image formation, and wherein until an area of the image bearing member which forms the first contacting portion in the section moves to a second contacting portion by rotating the image bearing member, the control means controls to switch the surface potential to be formed in the area so that a potential difference is formed to generate electrostatic force which moves the developer charged with the normal polarity from the image bearing member toward the developing means.

Further features of the present invention will become apparent from the following description of exemplary embodiments with reference to the attached drawings.

DESCRIPTION OF THE EMBODIMENTS

The following is a more detailed description of the image forming apparatus according to the present invention in accordance with the drawings.

1. Configuration and Operation of the Image Forming Apparatus

Figure 1:
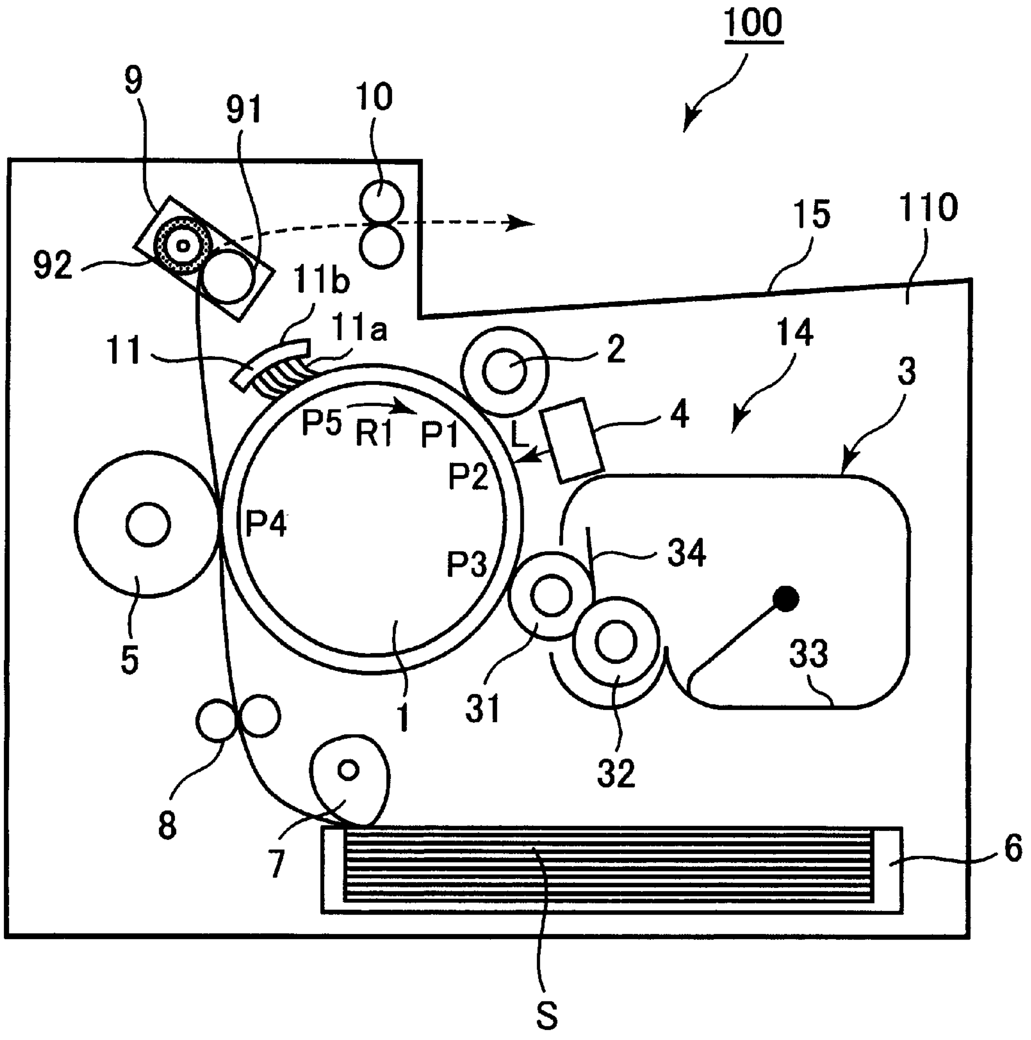
FIG. 1 is a schematic cross-sectional drawing of the image forming apparatus.

FIG. 1 is a schematic cross-sectional drawing of the present embodiment of an image forming apparatus 100. The image forming apparatus 100 in the present embodiment is a monochrome printer capable of forming black monochrome images using the electrophotographic method (electrophotographic image forming process).

The image forming apparatus 100 has a photosensitive drum 1, which is a rotatable drum-type (cylindrical) photosensitive member (electrophotographic member) as an image carrier. In the present embodiment, the photosensitive drum 1 is a negatively charged organic photosensitive member. The photosensitive drum 1 has a photosensitive layer on a grounded aluminum drum-like substrate, and is driven by a drive unit (not shown) in the direction of arrow R1 in the Figure (clockwise direction) at a specified process speed. In the present embodiment, the process speed corresponds to the peripheral speed (surface moving speed) of the photosensitive drum 1. Surrounding the photosensitive drum 1 are a charging roller 2, an exposure unit 4, a developing unit 3, a transfer roller 5, and a brush member 11, all of which are described below.

The charging roller 2, which is a roller-type charging member (contact charging member) as the charging means, contacts the photosensitive drum 1 with a predetermined pressure contact force to form the charging portion. The surface of the photosensitive drum 1, which is rotating, is uniformly charged by the charging roller 2 to a predetermined potential of a predetermined polarity (negative polarity in the present embodiment). During the charging process, a predetermined charging voltage (charging bias) is applied to the charging roller 2 by a charging power source (high-voltage power supply) E1 (FIG. 7) as the charging voltage application means (charging voltage application portion).

The exposure unit 4 as the exposure means is, in the present embodiment, a laser scanner unit. The exposure unit 4 outputs a laser beam corresponding to image information input from an external device such as a host computer, and scans and exposes the surface of the photosensitive drum 1 that has been uniformly charged. This exposure forms an electrostatic latent image (electrostatic image) on the surface of the photosensitive drum 1 in accordance with the image information. The exposure unit 4 is not limited to a laser scanner unit, but may employ, for example, an LED array in which a plurality of LEDs are arranged along the rotation axis direction of the photosensitive drum 1.

The electrostatic latent image formed on the surface of the photosensitive drum 1 is developed (visualized) by supplying toner as a developer by the developing unit 3 as the developing means, forming a toner image (developer image) on the surface of the photosensitive drum 1. In the present embodiment, the contact development method is used as the development method. The developing unit 3 has a developing roller 31 as a developer carrier (developing member), a toner supplying roller 32 as a developing means, a developer compartment 33 that contains toner, and a developing blade 34 as a regulating member that controls the thickness of the toner layer on the developing roller 31. The toner supplied to the developing roller 31 by the toner supplying roller 32 from the developer compartment 33 is charged to a predetermined polarity as it passes through the developing roller 31 and the developing blade 34 contact portion.

In the present embodiment, a single-component non-magnetic developer, a toner with an average particle size of 6 μm and a negative regular charging polarity (normal polarity) is used as the developer. In the present embodiment, a single-component non-magnetic contact developing method is employed as the developing method, but other developing methods, such as a two-component non-magnetic contact/non-contact developing method, or a magnetic developing method may also be used. The electrostatic latent image formed on the surface of the photosensitive drum 1 is developed at the developing portion, which is the opposing (contacting) portion between the developing roller 31 and the photosensitive drum 1, where the toner carried by the developing roller 31 is supplied. During the developing process, a predetermined developing voltage (developing bias) is applied to the developing roller 31 by a developing power supply (high-voltage power supply) E2 (FIG. 7) as the developing voltage applying means (developing voltage applying portion). In the present embodiment, toner charged with the same polarity as that of the photosensitive drum 1 (negative polarity in the present embodiment) adheres to the developing portion of the photosensitive drum 1 after the charging process, where the charge has decayed due to exposure (image portion) (reverse development method).

A transfer roller 5, which is a roller-type transfer member as a transfer means, is positioned opposing photosensitive drum 1. The transfer roller 5 is pressed toward the photosensitive drum 1 to form a transfer portion where the photosensitive drum 1 and the transfer roller 5 are pressed together. A transfer power supply (high-voltage power supply) E3 (FIG. 7) as a transfer voltage applying means (transfer voltage applying portion) is connected to the transfer roller 5, and a predetermined voltage is applied at a predetermined timing. The toner image formed on the surface of the photosensitive drum 1 is transferred to the surface of a recording material S being fed between the photosensitive drum 1 and the transfer roller 5 in the transfer portion. During the transfer process, a predetermined transfer voltage (transfer bias) is applied to the transfer roller 5 by the transfer power source (high voltage power source) E3 (FIG. 7), which is a DC voltage of the opposite polarity (positive polarity in the present embodiment) of the toner's regular polarity. As the transfer roller 5, one having an elastic layer formed of an elastic member such as polyurethane rubber, EPDM (ethylene propylene diene rubber) or NBR (nitrile butadiene rubber) can be suitably used. In particular, as the transfer roller 5, one having a foamed elastic layer formed of a foamed elastic member such as sponge rubber, for example, can be suitably used.

The recording material S is stored in a cassette 6. The recording material S stored in the cassette 6 is fed out one by one from the cassette 6 by a feeding unit 7, and is then fed to a resistor roller pair 8. The recording material S is then fed to the transfer portion by the resistor roller pair 8 in accordance with the timing when the toner image formed on the surface of the photosensitive drum 1 arrives at the transfer portion.

The recording material S on which the toner image has been transferred is fed to a fixing unit 9 as the fixing means. In the present embodiment, the fixing unit 9 is of a film heating method with a fixing film 91 and a pressure roller 92 that presses against the fixing film 91. A fixing heater and a thermistor for measuring the temperature of the fixing heater, etc., are arranged on the inner circumferential side of the endless fixing film 91. The fixing unit 9 fixes (melts and adheres) the toner image to the surface of the recording material S by heating and pressurizing the recording material S carrying the unfixed toner image while feeding it between the fixing film 91 and the pressure roller 92. The recording material S on which the toner image has been fixed is discharged (output) to the outside of the main body of the apparatus 110 (outside the apparatus) by a discharging roller pair 10, and is stacked on a tray 15 provided on the upper part of the main body of the apparatus 110.

Adhesive materials such as toner that remain on the surface of the photosensitive drum 1 without being transferred to the recording material S during the transfer process (residual transfer toner) are removed from the surface of the photosensitive drum 1 in the following process.

Residual transfer toner is mainly toner that is charged with negative polarity, which is the regular polarity. However, residual transfer toner includes toner that is positively charged and toner that is negatively charged but does not have sufficient charge. The residual transfer toner is charged to negative polarity again by discharge in the charging portion. The residual transfer toner, which is charged to negative polarity again in the charging portion, reaches the developing portion as the photosensitive drum 1 rotates. As described above, a latent electrostatic image is formed on the surface of the photosensitive drum 1 that has reached the developing portion. The behavior of the residual transfer toner that reaches the developing portion is described separately for the image portion (exposed portion) and the non-image portion (unexposed portion) of the surface of the photosensitive drum 1.

The residual transfer toner adhering to the non-image portion of the photosensitive drum 1 is transferred to the developing roller 31 by the potential difference between the potential of the non-image portion of the surface of the photosensitive drum 1 and the developing voltage in the developing portion, removed from the photosensitive drum 1, and collected in the developer compartment 33. The potential of the developing voltage is set to a potential between the potential of the non-image portion of the surface of the photosensitive drum 1 and the potential of the image portion (exposed portion). The toner collected in the developer compartment 33 is used again for image formation.

The residual transfer toner adhering to the image portion (exposed portion) of the surface of the photosensitive drum 1 is not transferred from the photosensitive drum 1 to the developing roller 31 in the developing portion. This residual transfer toner, together with toner supplied from the developing roller 31 to the photosensitive drum 1, constitutes a toner image, which is transferred to the recording material S in the transfer portion and removed from the photosensitive drum 1.

The configuration and operation of a brush member 11 as a means of removing paper dust are described in detail below.

In the present embodiment, the photosensitive drum 1, the charging roller 2 as the process means acting on it, the developing unit 3, and the brush member 11 to be described later, together constitute a process cartridge 14 that can be attached to and detached from the main body of the apparatus 110.

The position in the rotation direction of the photosensitive drum 1 where the charging process by the charging roller 2 on the photosensitive drum 1 is performed is a charging position P1. In the present embodiment, the charging roller 2 electrically charges the surface of the photosensitive drum 1 using electrical discharges that occur in at least one of the minute air gaps formed upstream and downstream of the contact portion between the charging roller 2 and the photosensitive drum 1 in the rotation direction of the photosensitive drum 1. For simplicity, however, the position on the photosensitive drum 1 that is in contact with the charging roller 2, i.e., the position on the photosensitive drum 1 that forms the charging portion described above, may be considered to be the charging position P1. More precisely, the charging position P1 can be defined as the position between the most upstream and the most downstream contact portions of the charging roller 2 and the photosensitive drum 1 in the rotation direction of the photosensitive drum 1. An exposure position P2 is the position in the rotation direction of the photosensitive drum 1 where the light is irradiated by the exposure unit 4 on the photosensitive drum 1. The position on the photosensitive drum 1 where toner is supplied from the developing roller 31 on the photosensitive drum 1 (the position where the developing roller 31 is in contact) in the rotation direction of the photosensitive drum 1, that is, the position on the photosensitive drum 1 where the developing portion described above is formed, is a developing position P3. The position on the photosensitive drum 1 where the toner is transferred to the recording material S on the photosensitive drum 1 in the rotation direction (the position where the transfer roller 5 is in contact), i.e., the position on the photosensitive drum 1 forming the transfer portion described above, is a transfer position P4. In addition, the position on the photosensitive drum 1 in the rotation direction where paper dust is removed by the brush member 11 described below on the photosensitive drum 1 (the position where the brush member 11 is in contact), that is, the position on the photosensitive drum 1 forming the brush contact portion described below, is a brush contact position P5. The developing position P3, the transfer position P4, and the brush contact position P5 can also be set to be intermediate positions between the most upstream and the most downstream positions in the rotation direction of the photosensitive drum 1.

2. Control Mode

Figure 7:
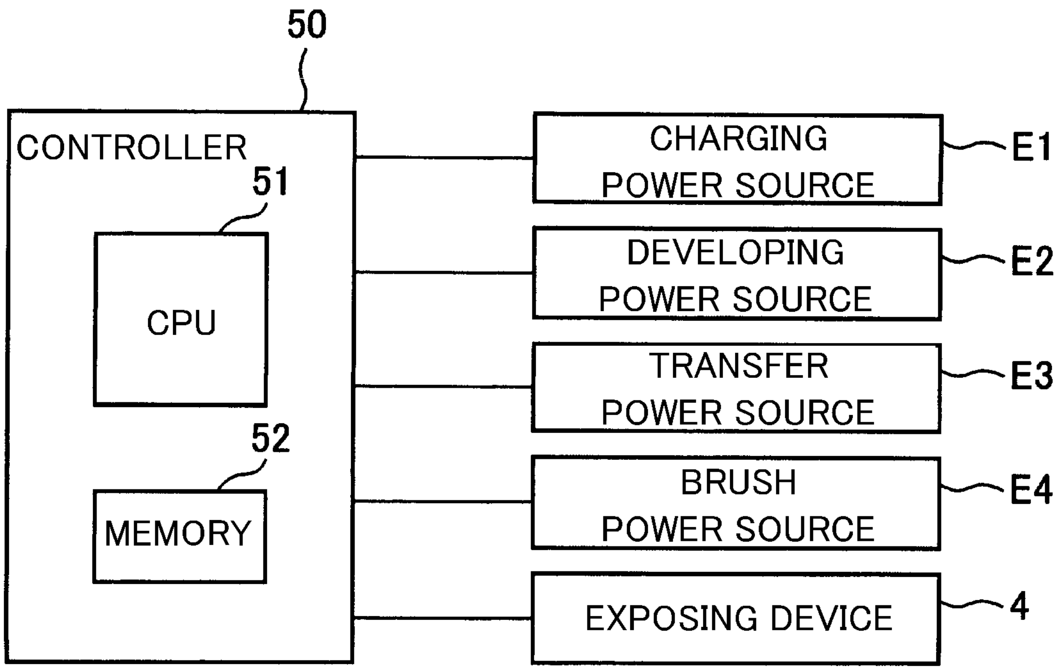
FIG. 7 is a schematic block diagram showing the control mode of the image forming apparatus.

FIG. 7 is a schematic block diagram showing the control portion of the key parts of the image forming apparatus 100 in the present embodiment. The image forming apparatus 100 has a control portion 50. The control portion 50 has a CPU 51 as a central element that performs arithmetic processing, a memory (storage element) 52 such as ROM and RAM as a storage means, and an input/output portion (not shown) that controls the exchange of signals between elements connected to the control portion 50. The RAM stores sensor detection results, calculation results, etc., while the ROM stores control programs, pre-determined data tables, etc.

The control portion 50 is a control means that can comprehensively control the operation of the image forming apparatus 100. Each portion of the image forming apparatus 100 is connected to the control portion 50. In the present embodiment, for example, the charging power source E1, developing power source E2, transfer power source E3, brush power source E4 (described below), and exposure unit 4 are connected to the control portion 50. In the present embodiment, the transfer power source E3 is configured to be able to apply positive and negative polarity voltages to the transfer roller 5. The control portion 50 can control the operation (ON/OFF and output values) of the various power sources (bias supply means) described above, the operation of the exposure unit 4 (ON/OFF and exposure amount), the timing of these operations, etc., to execute image forming and brush cleaning operations described below.

The image forming apparatus 100 is capable of executing a print job (print operation, printing operation), which is a series of operations to form an image on a single or multiple recording materials S, initiated by a single start instruction. In the present embodiment, the start instruction is input to the image forming apparatus 100 from an external device such as a personal computer. A print job generally has an image forming process (printing process), a pre-rotation process, a paper interval process when images are formed on multiple recording materials S, and a post-rotation process. The image forming process is the period during which an electrostatic latent image is actually formed on the photosensitive drum 1, the electrostatic latent image is developed (toner image formation), the toner image is transferred, and the toner image is fixed, etc. More precisely, the timing of image forming differs depending on the position at which these processes of forming the electrostatic latent image, forming the toner image, transferring the toner image, and fixing the toner image are performed. The pre-rotation process is a period of preparation operations prior to the image forming process. The paper interval process (between-image process) is a period corresponding to the time between two recording materials S when the image forming process is continuously performed for multiple recording materials S (during continuous image forming). The post-rotation process is a period of time during which an organizing operation (preparation operation) is performed after the image forming process. The non-image forming time is a period of time other than the image forming time, and includes the above-mentioned pre-rotation process, paper interval process, post-rotation process, and also the pre-multi-rotation process, which is a preparation operation when the power source of the image forming apparatus 100 is turned on or when the apparatus is returned from sleep mode. The timing during image forming corresponds to the period during which the image forming area on the photosensitive drum 1 passes through the positions where the above electrostatic image is formed, the toner image is formed, the toner image is transferred, and the toner image is fixed. The timing for non-image forming corresponds to the period when the non-image forming area on the photosensitive drum 1 is passing through each of the above positions. The image forming area on the photosensitive drum 1 is the area where the image that is transferred to the recording material S and output from the image forming apparatus 100 can be formed, and the non-image forming area is the area other than the image forming area.

Figure 8:
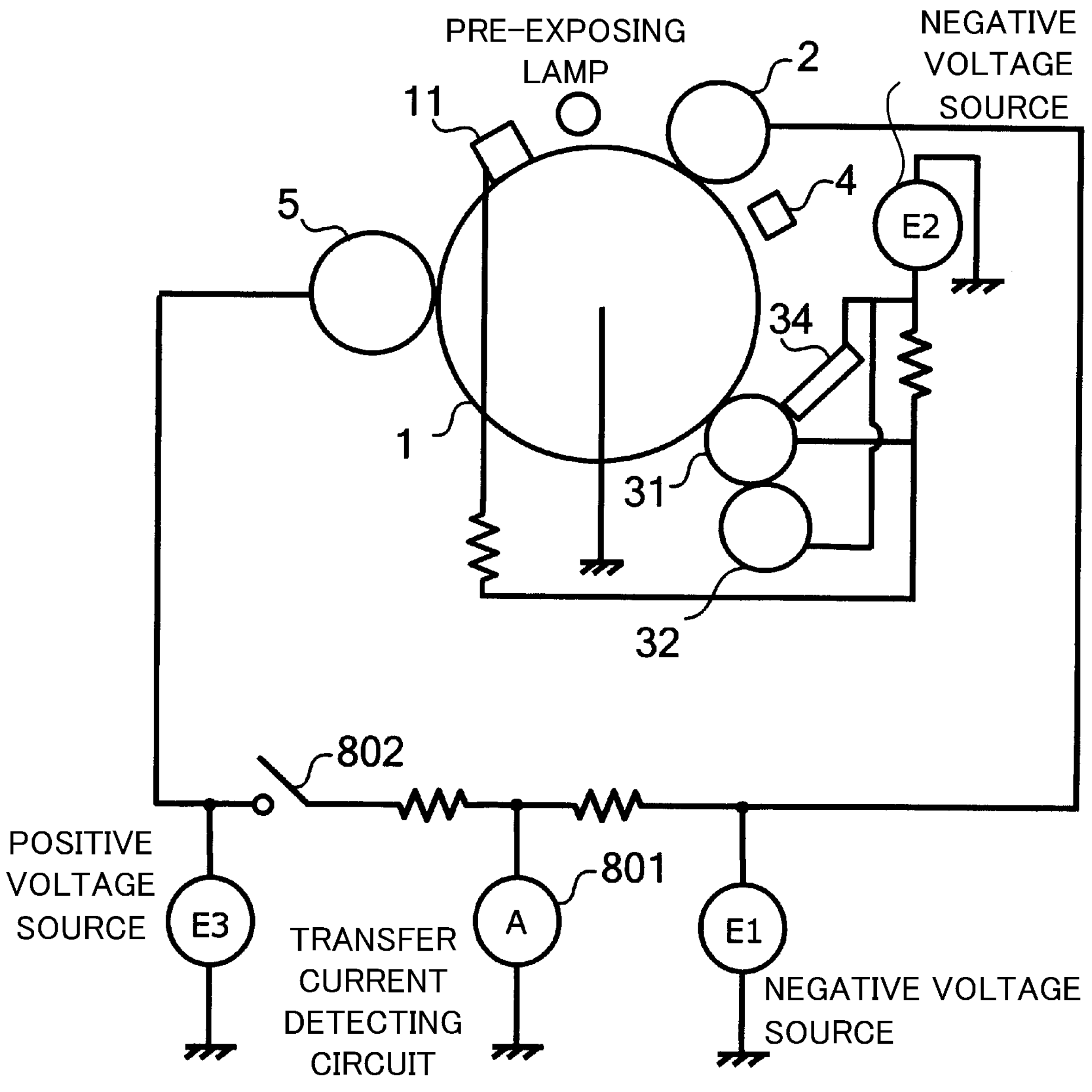
FIG. 8 is a schematic block diagram showing the power source configuration of the image forming apparatus.

FIG. 8 is a schematic block diagram showing a power source configuration different from that shown in FIG. 7 that can be applied to the image forming apparatus 100 in the present embodiment. In FIG. 8, elements that have the same or corresponding functions or configurations as those shown in FIGS. 1 and 7 are marked with the same symbols as in FIGS. 1 and 7. The following explanation focuses on the parts of the configuration in FIG. 8 that differ from the configuration in FIG. 7. In the configuration of FIG. 8, the developing power source E2, in addition to applying a developing voltage to the developing roller 31, further applies a voltage to the developing blade 34 and toner supplying roller 32. In other words, the power sources for the developing roller 31, developing blade 34, and toner supplying roller 32 are common. For example, a voltage of −380V is applied to the developing roller 31, −580V to the developing blade, and −580V to the toner supplying roller, respectively, by the developing voltage E2. Charging power source E1 (negative voltage source) applies negative polarity voltages to the transfer roller 5 and the charging roller 2. In other words, the power sources for the transfer roller 5 and the charging roller 2 are common. The negative voltage is applied to the transfer roller 5, for example, to return toner and paper dust to the photosensitive drum 1 when they adhere to the transfer roller 5. The power source E3 (positive voltage source) applies a positive polarity transfer voltage to the transfer roller 5. A current detection circuit 801 is used for current detection during constant current control. A switch 802 turns ON/OFF the application of negative voltage from the power source E1 to the transfer roller 5. The control portion 50 sets switch 802 to OFF during normal image forming control, and only positive voltage from the power supply E3 is applied to the transfer roller 5. FIG. 8 also shows a pre-exposure lamp, which is not shown in FIG. 1. In the present embodiment, a pre-exposure lamp may be provided. According to the configuration in FIG. 8, the configuration of the apparatus can be simplified by sharing the same power source as described above. When the configuration of FIG. 8 is applied, the power supply portions E1, E3, and switch 802 can be controlled by the control portion 50 to perform the brush cleaning operation described below.

3. Brush Member

Next, the configuration and action of the brush member 11 in the present embodiment are described.

As shown in FIG. 1, the present embodiment of the image forming apparatus 100 has a brush member 11, which is a paper dust removal member (collection member) as a paper dust removal means (paper dust removal mechanism). Paper dust is a fibrous foreign substance derived from paper and generally consists of pulp fibers, mainly cellulose, that have been detached from paper, and may also include filler material detached from paper.

The brush member 11 is composed of a pile string 11*a*, which is a plurality of bristles (base materials) that rub the surface of the photosensitive drum 1, and a base fabric 11*b* that supports the pile string 11*a*. The brush member 11 is arranged to form a brush contact portion (collection portion) in contact with the photosensitive drum 1 downstream from the transfer position (transfer portion) P4 and upstream from the charging position (charging portion) P1 in the rotation direction (moving direction of the surface) of the photosensitive drum 1. The brush member 11 is supported by a support member (not shown) and is arranged in a fixed position with respect to the photosensitive drum 1, and it slides over the surface of the photosensitive drum 1 as the photosensitive drum 1 moves. As described above, the brush contact position P5 is the position on the photosensitive drum 1 that forms the above brush contact area in the rotation direction of the photosensitive drum 1.

The brush member 11 collects (recovers) paper dust and other adhering matter transferred from the recording material S onto the photosensitive drum 1 at the transfer position P4, reducing the amount of paper dust that moves to the charging position P1 and developing position P3 downstream of the brush contact position P5 in the rotation direction of the photosensitive drum 1.

In the present embodiment, the pile string 11*a* of the brush member 11 is made of conductive nylon fiber, with nylon as the binder material and carbon mixed in as the conductive material. However, the material of the pile string 11*a* of the brush member 11 is not limited to this. For example, the material of the pile string 11*a* of the brush member 11 can be polyester or acrylic as the binder material, as long as the material is conductive.

In the present embodiment, the length of the brush member 11 in the direction parallel to the circumferential direction of the photosensitive drum 1 (hereinafter also referred to as the "short-hand direction") is set at 5 mm. However, the length of the brush member 11 in the short-hand direction is not limited to this. The length of the brush member 11 in the short-hand direction may be changed according to, for example, the amount of paper dust that varies with the lifetime of the image forming apparatus 100 and the process cartridge 14 (which tends to increase as the lifetime of the apparatus increases).

In the present embodiment, the pile length of the brush member 11 is set at 5 mm. However, the pile length of the brush member 11 is not limited to this. When the brush member 11 is used to collect paper dust, however, it is necessary to ensure that the penetration of the brush member 11 into the photosensitive drum 1 is above a certain amount. Therefore, if the pile length of the brush member 11 is short, the contact pressure to the photosensitive drum 1 becomes strong, and the surface of the photosensitive drum 1 may be damaged by the sliding. Therefore, it is desirable that the pile length of the brush member 11 be 4 mm or longer. Although not limited to this, the pile length of the brush member 11 is typically 10 mm or less. The pile length of the brush member 11 is the distance from the base fabric 11*b* to the leading end of the pile string 11*a* exposed from the base fabric 11*b* when the brush member 11 is on its own, that is, when no external force is applied to bend the pile string 11*a*.

In the present embodiment, the length of the brush member 11 in the direction parallel to the rotation axis direction of the photosensitive drum 1 (hereinafter also referred to as "longitudinal direction") is set at 230 mm. However, the length of the brush member 11 in the longitudinal direction is not limited to this. The length of the brush member 11 in the longitudinal direction may be changed according to, for example, the maximum image forming width of the image forming apparatus 100.

In the present embodiment, the fineness of the brush member 11 is set to 2 d (meaning 2 g per 9000 m of fiber). The "d" is an acronym for denier. However, the fineness of the brush member 11 is not limited to this. When the fineness of the brush member 11 is high, however, each fiber is stiff and the pressure of the brush member 11 against the photosensitive drum 1 becomes strong, which may damage the surface of the photosensitive drum 1 by friction. Therefore, it is desirable that the fineness of the brush member 11 be 6 d or less. Although not limited to this, the fineness of the brush member 11 is typically 1 d or more.

In the present embodiment, the density of the brush member 11 is set at 240 kF/inch$^2$ (kF/inch$^2$ is a unit of brush density and indicates the number of filaments per square inch). However, the density of the brush member 11 is not limited to this. When the brush member 11 is used for collecting paper dust, however, a low density increases the possibility of paper dust slipping through. Therefore, the density should be 120 kF/inch$^2$ or higher. Although not limited to this, the density of the brush member 11 is typically 300 kF/inch$^2$ or less.

In the present embodiment, the penetration amount of the brush member 11 is set at 1.5 mm. However, the amount of penetration of the brush member 11 is not limited to this. When the brush member is used to collect paper dust, a small penetration amount of the brush member 11 into the photosensitive drum 1 increases the possibility of the paper dust slipping through. Therefore, the penetration of the brush member 11 should be 1 mm or more. Although not limited to this, the penetration of the brush member 11 is typically 3 mm or less. When the above pile length is L1 and the shortest distance from the base fabric 11*b* of the brush member 11 fixed to the above support member to the photosensitive drum 1 is L2, the difference between L2 and L1 is the penetration amount of the brush member 11 into the photosensitive drum 1.

In the present embodiment, a brush voltage applying means (brush voltage applying portion), brush power supply (high voltage power supply) E4 (FIG. 7), is connected to the brush member 11, and a predetermined voltage is applied to the brush member 11 at a predetermined timing. In the present embodiment, a voltage of mainly negative polarity is applied to the brush member 11 from the brush power supply E4 in order to collect paper dust of positive polarity that adheres to the surface of the photosensitive drum 1 of negative polarity mainly at the transfer position P4. In the present embodiment, the brush power supply E4 applies a voltage in the range of −500V to 0V to the brush member 11.

In the present embodiment, the electrical resistance of the brush member 11 is $1.0\times10^5\Omega$ when measured as follows. That is, the brush member 11 is fixed to an aluminum cylinder with the brush member 11 advancing 1 mm from the leading end of the pile string 11*a* in the direction of the length of the pile of the brush member 11. The electrical resistance of the brush member 11 was measured by applying a voltage of 50V to the brush member 11 while the aluminum cylinder was rotated at 50 mm/sec. However, the electrical resistance of the brush member 11 is not limited to this, and a relatively high-resistance brush member 11 with electrical resistance up to $1.0\times10^8\Omega$ or less may be used.

4. Brush Cleaning Operation

Brush Cleaning Operation Overview

Not only paper dust, but also residual transfer toner and toner on non-image portions of the photosensitive drum 1 (fogging toner) accumulate on the brush member 11. If too much toner accumulates on the brush member 11, the brush member 11 may not be able to hold the toner, and the toner may slip off the brush member 11 and adhere to the charging roller 2, causing charging failure.

Therefore, in the present embodiment, the image forming apparatus 100 is configured to be able to perform a brush cleaning operation (brush cleaning control) to discharge toner from the brush member 11 during non-image forming at a predetermined timing. This can suppress excessive accumulation of toner on the brush member 11.

In the present embodiment, the brush cleaning operation is performed in a post-rotation process, which is an example of a non-image forming process. However, the brush cleaning operation can be performed at any non-image forming process, and may be performed in the pre-rotation process, the pre-multi-rotation process, the between-paper process, and so on. The brush cleaning operation is not limited to being performed in the post-rotation process or other processes every time a print job is executed. For example, it can be performed when any index value that correlates with the amount of toner accumulated in the brush member 11 (amount of brush member 11 used), such as the number of images formed, the number of rotations or rotation time of the photosensitive drum 1, or the time of voltage application to the brush member 11, exceeds a specified threshold value.

Control of the Present Embodiment

Figure 2:
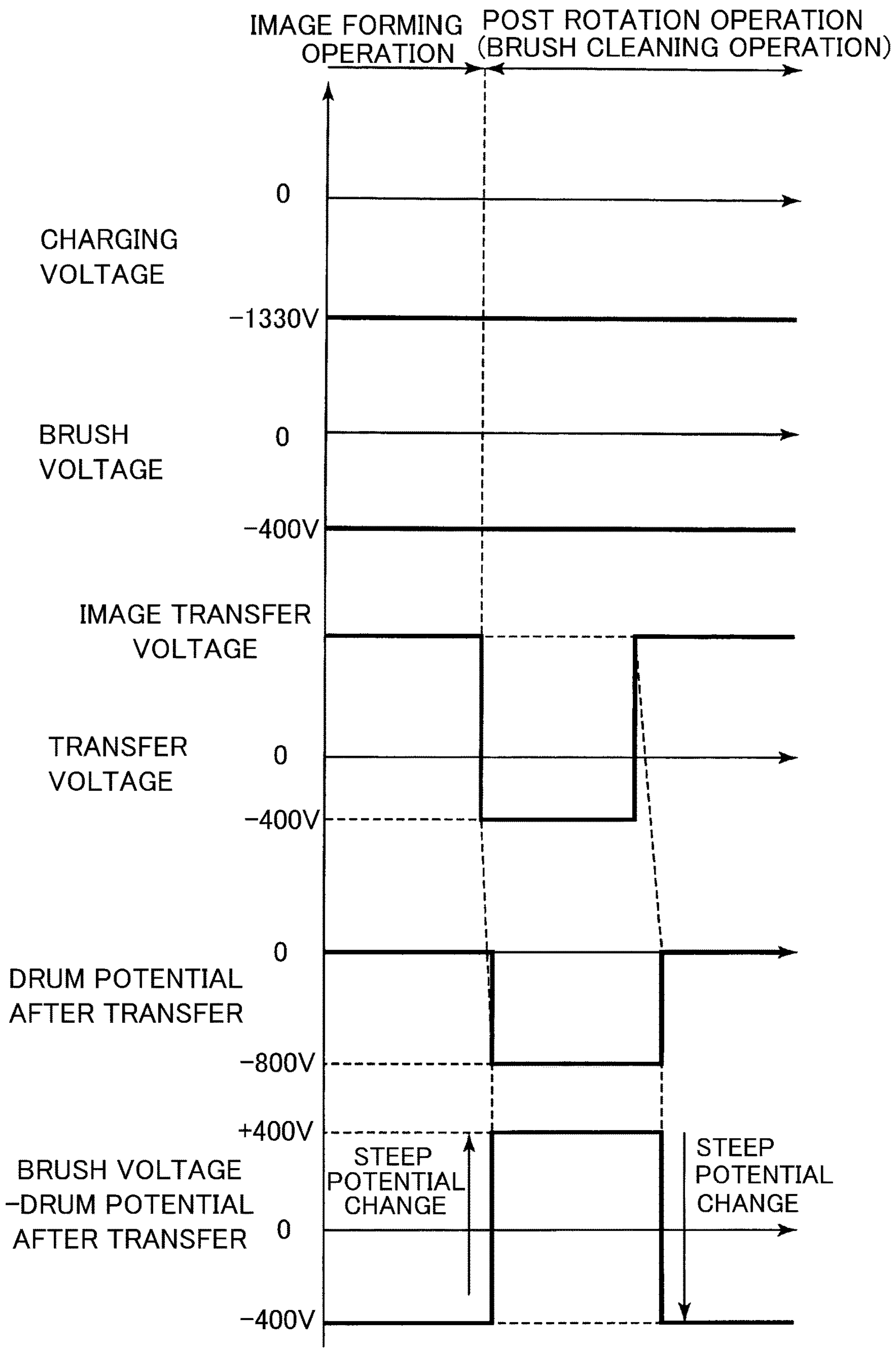
FIG. 2 is a timing chart diagram showing the control of Embodiment 1.

Next, the brush cleaning operation in the present embodiment is explained. FIG. 2 is a timing chart diagram showing the operation of each portion in the image forming apparatus 100 of the present embodiment when the brush cleaning operation is performed in the post-rotation operation until the operation of the image forming apparatus 100 is stopped after an image forming operation (e.g., a one-sheet print operation). The Figure shows the time transition of the charging voltage applied to the charging roller 2 from the charging power source E1, the brush voltage applied to the brush member 11 from the brush power source E4, and the transfer voltage applied to the transfer roller 5 from the transfer power source E3. Also shown in the same Figure are the surface potential of the photosensitive drum 1 after the transfer, which is subjected to the transfer voltage, and the time transition of the difference between the brush voltage and the surface potential of the photosensitive drum 1 after the transfer. The operation shown in FIG. 2 is controlled by the control portion 50 by sending control signals to each power supply portion.

The surface potential of the photosensitive drum 1 is simply referred to as "drum potential" and the surface potential of the photosensitive drum 1 after transfer is simply referred to as "post-transfer drum potential." Here, the post-transfer drum potential is, more precisely, the surface potential of the photosensitive drum 1 when passing through the contact position P5, i.e., the surface potential of the photosensitive drum 1 at the contact position P5. However, the post-transfer drum potential can be represented by the surface potential of the photosensitive drum 1 after passing through the transfer position P4 and just before reaching the brush contact position P5. Toner charged with negative polarity is also referred to as "negative toner" and toner charged with positive polarity as "positive toner." In the present embodiment, the transfer voltage is controlled at a constant voltage. The constant voltage control of the transfer voltage is a control to adjust the output voltage of the transfer power source E4 so that it becomes roughly constant at the target voltage. The potential difference between the brush voltage and the post-transfer drum potential means the value of the brush voltage minus the post-transfer drum potential (including positive and negative signs), as described below in detail.

As shown in FIG. 2, during the image forming operation and brush cleaning operation, a charging voltage of −1300V is applied to the charging roller 2, and the drum potential is uniformly set to about −800V in the rotation direction of the photosensitive drum 1. During the image forming operation and brush cleaning operation, a brush voltage of −400V, which is approximately intermediate between the drum potential of −800V in the non-image portion and the drum potential of 0 to −100V in the image portion, is applied to the brush member 11. Thus, the brush voltage should be set so that image defects due to discharge between the brush member 11 and photosensitive drum 1 do not occur (i.e., the absolute value should be set to a voltage below the discharge threshold between the brush member 11 and photosensitive drum 1). In addition, by setting the brush voltage to a potential approximately halfway between the drum potential of the non-image portion and the drum potential of the image portion, the following effect can be obtained. In other words, for both negative and positive toner polarities accumulated on the brush member 11, the toner can be removed from the brush member 11 to the photosensitive drum 1 by adjusting the drum potential. Furthermore, by setting the brush voltage in this way, the following effect can also be obtained. In other words, the brush voltage can be set to a potential relationship that allows the negative toner (toner of regular polarity) contained in the residual transfer toner to pass through the brush contact position P5 without adhering to the brush member 11 for image portions with a drum potential of approximately 0 to −100V. This can suppress excessive accumulation of toner on the brush member 11.

During the forming operation, a transfer voltage of about +1000V is applied to the transfer roller 5. This transfer voltage during the image forming operation can be changed based on, for example, the type of the recording material S or the detection result of the electrical resistance of the transfer portion. After the transition to the post-rotation operation (brush cleaning operation), a transfer voltage of −400V is applied to the transfer roller 5 as a voltage within the range where the absolute drum potential is not reduced by the discharge against the drum potential of −800V in the non-image portion. This widens the difference between the brush voltage and the post-transfer drum potential without decreasing the absolute value of the post-transfer drum potential, and the potential difference discharges the positive toner accumulated on the brush member 11 from the brush member 11 to the photosensitive drum 1. Thereafter, a transfer voltage of +1000V, equivalent to the transfer voltage during image forming operation, is applied to the transfer roller 5. This operation lowers the absolute value of the post-transfer drum potential to about 0V, thereby widening the difference between the brush voltage and the post-transfer drum potential to the opposite side of the potential difference described above, and discharging the negative toner that may have accumulated on the brush member 11 from the brush member 11 to the photosensitive drum 1. According to the brush cleaning operation shown in FIG. 2, both regular polarity (the main toner charging polarity during the developing process) and non-regular polarity (opposite polarity to the regular polarity) toner can be handled, improving the cleaning of the brush member 11 positioned in contact with the photosensitive drum 1 for collecting paper dust.

Action of the Present Embodiment

Figure 4:
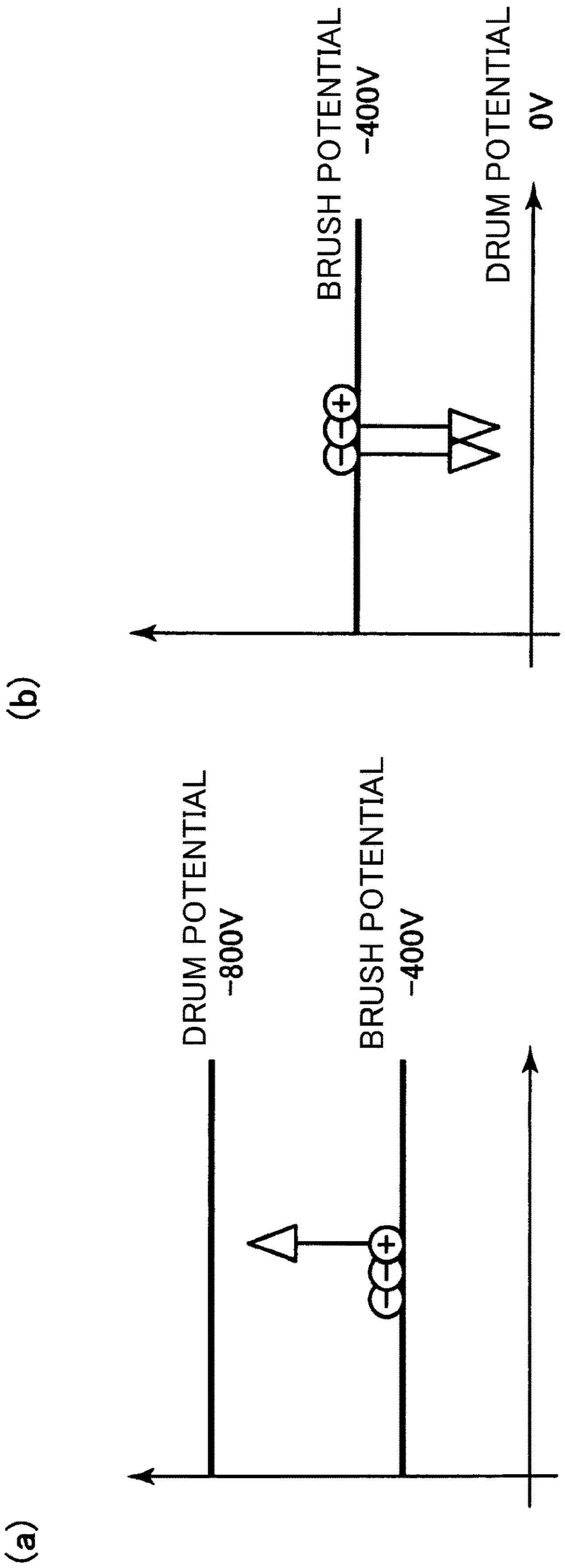
FIG. 4, part(a) and part(b), is a schematic drawing showing the behavior of toner accumulated on the brush.

Next, the action of the brush cleaning operation in the present embodiment is further explained. By increasing the absolute value of the potential difference between the brush voltage and the drum potential, toner is discharged from the brush member 11 to the photosensitive drum 1. As shown in FIG. 4 (*a*), if the drum potential is higher than the brush voltage with respect to the negative potential, which is the normal polarity (i.e., if the potential difference between the brush voltage and the post-transfer drum potential is positive), positive toner is discharged from the brush member 11 onto the photosensitive drum 1. On the other hand, as shown in FIG. 4 (*b*), if the drum potential is lower than the brush voltage with respect to the negative potential, which is the regular polarity (i.e., if the potential difference between the brush voltage and the post-transfer drum potential is negative), negative toner is discharged from the brush member 11 onto the photosensitive drum 1. Therefore, by changing the potential difference between the brush voltage and the drum potential to both positive and negative, both negative and positive toner can be discharged from the brush member 11 onto the photosensitive drum 1. In other words, the cleaning performance of the brush member 11 for collecting paper dust can be improved.

In addition to the potential difference between the brush voltage and the drum potential, a gap can be formed in the surface potential of the photosensitive drum 1 to more efficiently discharge toner from the brush member 11 onto the photosensitive drum 1. This point is explained using FIG. 5.

Figure 5:
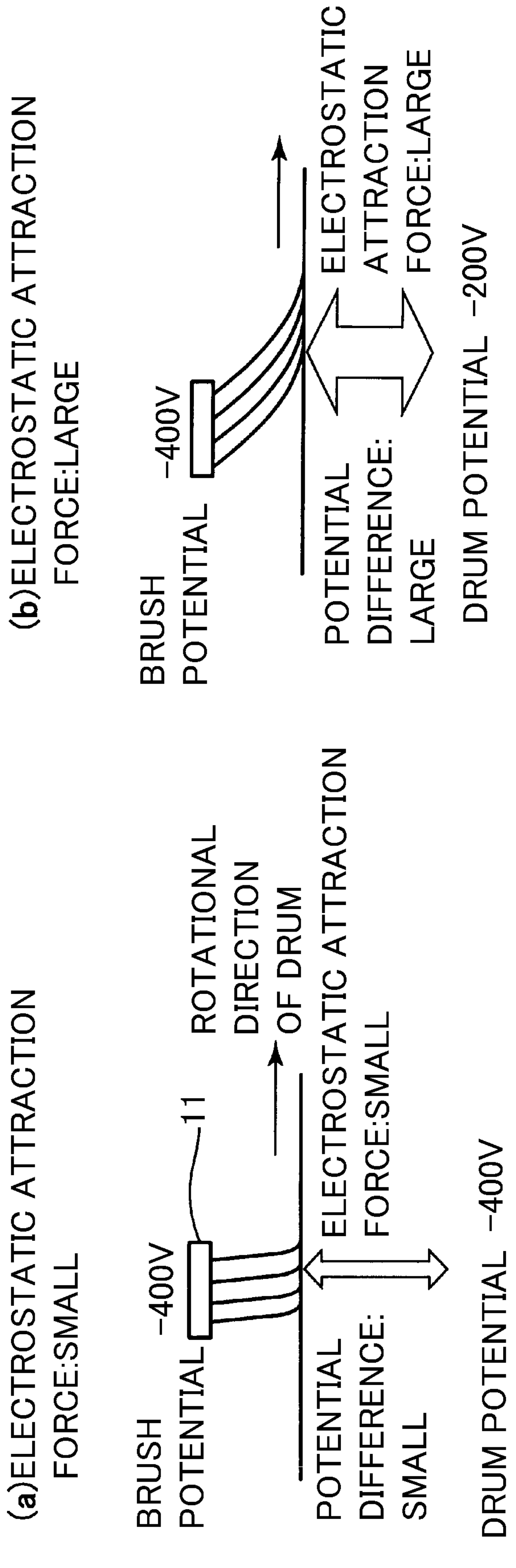
FIG. 5, part(a) and part(b), is a schematic drawing showing the posture change of the brush.

FIG. 5 (*a*) is a schematic drawing showing the posture of the brush member 11 when the drum potential is set to −400V against the brush voltage of −400V during the rotational drive operation of the photosensitive drum 1. Since the potential difference between the brush voltage and the photosensitive drum 1 is small, the electrostatic adsorption force is small. Therefore, the dynamic frictional force between the brush member 11 and the photosensitive drum 1 causes the tips of the pile string 11*a* to flow downstream of the photosensitive drum 1 in the rotation direction, but the overall posture change of the brush member 11 is small.

On the other hand, FIG. 5 (*b*) is a schematic drawing showing the posture of the brush member 11 when the drum potential is set to −200V against the brush voltage of −400V during the rotational drive operation of the photosensitive drum 1. Since the electrostatic adsorption force increases compared to the case of FIG. 5 (*a*), the tips of the pile string 11*a* and the photosensitive drum 1 are more adsorbed. Therefore, the tips of the pile strings 11*a* are pulled downstream in the rotation direction of the photosensitive drum 1, and the entire brush member 11 is pulled into a posture downstream in the rotation direction of the photosensitive drum 1. When the posture change occurs in the entire brush member 11, the following toner moves with the brush member 11. In other words, toner that has not been in contact with the photosensitive drum 1, toner with a low charge that is difficult to move by electric potential difference alone, or toner that is trapped by paper dust collected on the brush member 11 and is difficult to discharge. When such toner comes in contact with or approaches the photosensitive drum 1, it is discharged from the brush member 11 when it is subjected to a force from the side of the brush member 11 to be discharged from the brush member 11 onto the photosensitive drum 1. Thus, by using not only the potential difference but also the posture change of the brush member 11, the toner accumulated on the brush member 11 can be efficiently discharged onto the photosensitive drum 1.

As mentioned above, the relative potential difference between the brush member and the drum potential, including the positive and negative signs, is important for the posture change of the brush member 11. Therefore, here, the potential difference between the brush voltage and the drum potential refers to the relative potential difference including positive and negative signs between the brush voltage and the drum potential.

The negative toner discharged from the brush member 11 onto the photosensitive drum 1 passes through the charging position P1. This is because the force toward the photosensitive drum 1 is electrostatically higher than the force toward the charging roller 2 due to the potential difference between the charging voltage (−1300V) and the drum potential (−800V). The negative toner is then collected in the developing unit 3 due to the potential difference between the developing voltage (−400V) and the drum potential (−800V).

The positive toner discharged from the brush member 11 onto the photosensitive drum 1 is affected by the electrical discharge at the charging position P1, reverses the charge polarity, and becomes negative toner, which is collected in the developing unit 3 in the same manner as the negative toner described above.

However, further improvement of the brush cleaning operation shown in FIG. 2 is possible. That is, when the amount of toner discharged from the brush member 11 is large, negative toner may not be fully passed through the charging position P1 due to the potential difference between the above charging voltage and the drum potential. Also, positive toner may not be fully converted to negative toner due to the effect of discharge at the above charging position P1. In either case, the toner may adhere to the charging roller 2 and stain the charging roller 2 with toner. The charged roller 2 with toner adhering to it cannot uniformly charge the surface of the photosensitive drum 1 in the rotation direction, causing abnormal discharge, which may result in spotty image defects on the halftone image (here also referred to as "white spot images"). It is desired to address this issue as well. The following is a modified example of the present embodiment that addresses this issue.

Control of the Modified Example

Next, the brush cleaning operation in the modified example is explained.

Figure 3:
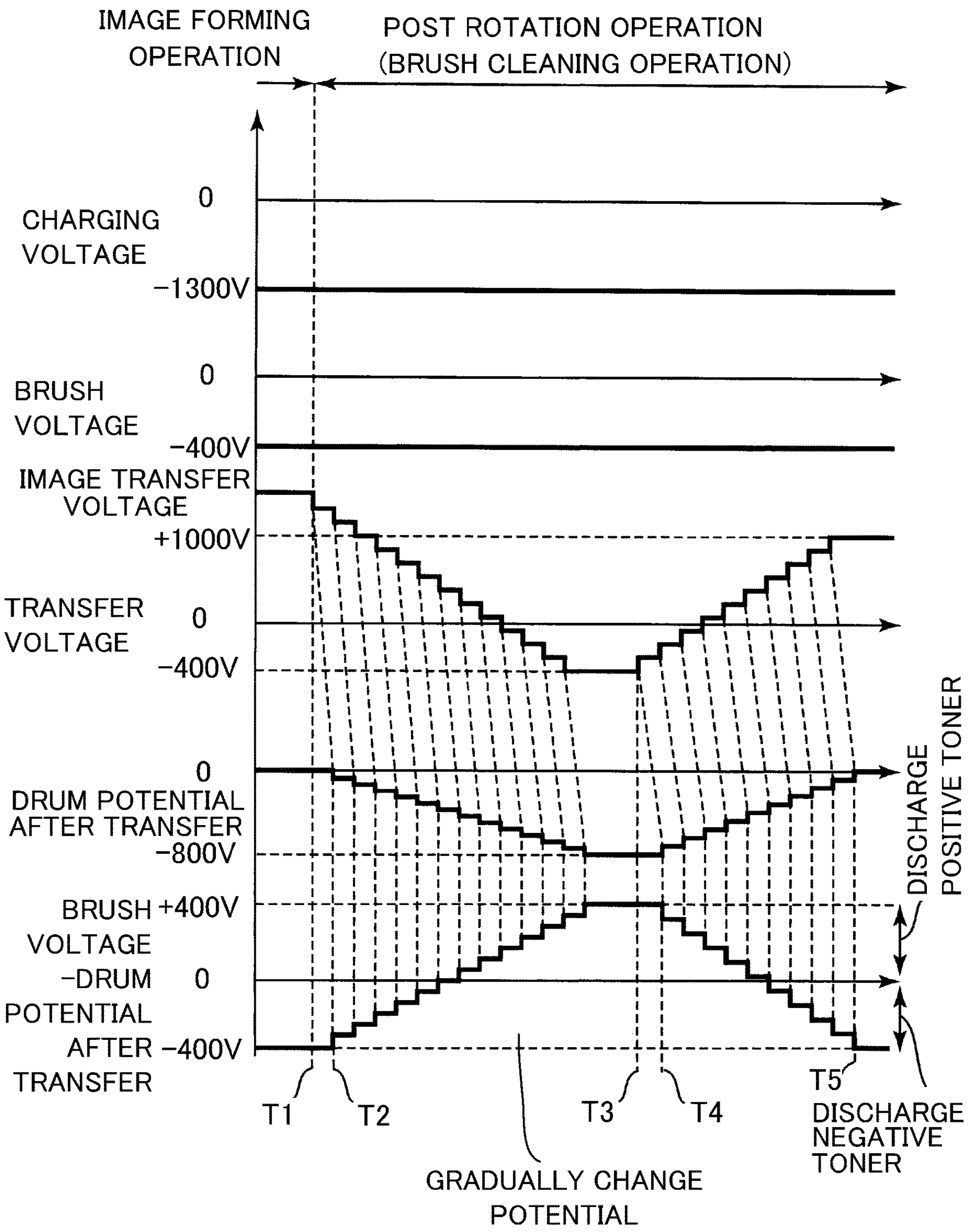
FIG. 3 is a timing chart diagram showing the control of a modified example of Embodiment 1.

FIG. 3 is a timing chart diagram showing the operation of each portion of the image forming apparatus 100 according to the modified example, when the brush cleaning operation is performed in the post-rotation operation after the image forming operation (e.g., one-sheet print operation) until the operation of the image forming apparatus 100 is terminated. The process according to the timing chart in FIG. 3 is the process performed by the control portion 50 controlling the voltage output of each power supply portion. As in FIG. 2, FIG. 3 shows the time transition of the charging voltage, brush voltage, transfer voltage, post-transfer drum potential, and the potential difference between the brush voltage and the post-transfer drum potential. The operation shown in FIG. 3 is controlled by the control portion 50, which sends control signals to each power supply portion. In the present embodiment, the transfer voltage is also controlled by constant voltage control.

The operation of each portion of the photosensitive drum 1 in the modified example shown in FIG. 3, from the start of the rotational drive of the photosensitive drum 1 to the end of the image forming operation, is the same as that shown in FIG. 2.

In the modified example, after the transition to the post-rotation operation (brush cleaning operation), at T1, the transfer voltage is sequentially changed to the surface of the photosensitive drum 1 at the transfer position P4. At T2, the surface of the photosensitive drum 1 to which the transfer voltage that has been varied one step from T1 is applied moves in the rotation direction of the photosensitive drum 1 and reaches the brush contact position P5. Thereafter, the transfer voltage is varied in steps from about +1000V during the image forming operation to −400V. In other words, the potential difference between the brush voltage and the post-transfer drum potential is changed in steps from −400V to +400V. Then, at T3, the transfer voltage is started to change stepwise in the direction of positive polarity from −400V. At T4, the surface of the photosensitive drum 1 to which the transfer voltage that has been changed one step from T3 is applied moves in the rotation direction of the photosensitive drum 1 and reaches the brush contact position P5. Thereafter, the transfer voltage is varied in 10 steps from −400V to +1000V. In other words, the potential difference between the brush voltage and the post-transfer drum potential is changed in 10 steps from +400V to −400V. At T5, the surface of the photosensitive drum 1 to which the final transfer voltage of +1000V is applied in the brush cleaning operation in the modified example moves in the rotation direction of the photosensitive drum 1 and reaches the brush contact position P5.

The width of one step in changing the transfer voltage in steps from the transfer voltage during image formation to −400V is approximately the same as the width of one step in changing the transfer voltage in steps from −400V to +1000V in 10 steps (140V in the modified example). The number of steps in changing the transfer voltage stepwise from the transfer voltage at the time of image formation to −400V depends on the transfer voltage at the time of image formation.

Action of the Modified Example

Next, the action of the brush cleaning operation in the modified example is explained. Here, the action of the brush cleaning operation in FIG. 2 (present embodiment) and the brush cleaning operation in FIG. 3 (modified example) is explained by comparing the brush cleaning operation in FIG. 2 (present embodiment) and the brush cleaning operation in FIG. 3 (modified example) in the case where an electric potential gap is formed in the photosensitive drum 1.

In the brush cleaning operation in FIG. 2, the posture of the brush member 11 changes abruptly from the aforementioned posture in FIG. 5 (*a*) to the posture in FIG. 5 (*b*) or from the posture in FIG. 5 (*b*) to the posture in FIG. 5 (*a*) because of the abrupt change in drum potential. Therefore, the amount of toner instantaneously discharged from the brush member 11 onto the photosensitive drum 1 is increased.

On the other hand, in the brush cleaning operation of FIG. 3, the posture of the brush member 11 gradually changes from the posture of FIG. 5 (*a*) to the posture of FIG. 5 (*b*) or from the posture of FIG. 5 (*b*) to the posture of FIG. 5 (*a*) by gradually changing the drum potential. Thus, in the brush cleaning operation shown in FIG. 3, the posture of the brush member 11 can be restrained from changing abruptly, so that toner is gradually discharged from the brush member 11 onto the photosensitive drum 1 every time a gap in the drum potential passes through the brush contact position P5.

The brush cleaning operation in FIG. 3 can also accommodate both regular polarity (the main charging polarity of toner during the development process) and non-regular polarity (opposite polarity to the regular polarity) toner, improving the cleaning of the brush member 11 positioned in contact with the photosensitive drum 1 for collecting paper dust, thus improving the cleaning performance of the brush member 11 arranged in contact with the photosensitive drum 1 for collecting paper dust.

Here, a gradual change in the potential difference between the brush voltage and the post-transfer drum potential means, more precisely, the following. For example, when the potential difference is changed steeply as shown in FIG. 2, a change of 800V takes about 100 ms. Gradually changing the potential difference means that the potential difference should be changed sufficiently slower than the above steep change so that the amount of toner instantaneously discharged from the brush member 11 onto the photosensitive drum 1 can be sufficiently reduced. For example, when the potential difference is changed as shown in FIG. 3, it is sufficient if the change of 800V is made in about 500 ms to 3000 ms. In other words, a gradual change in the potential difference between the brush voltage and the post-transfer drum potential typically means a change at a rate of about 0.2V/ms to 2V/ms. When the potential difference between the brush voltage and the post-transfer drum potential is changed gradually, a single-step change width should be set so that the above rate of change is obtained. For example, when the potential difference is changed in steps as shown in FIG. 3, the change width of one step can be set to about 50V to 100V, and the change of one step can be made in 50 ms to 100 ms. In the brush cleaning operation shown in FIG. 2, the amount of toner discharged from the brush member 11 may increase, and in the brush cleaning operation shown in FIG. 3, the downtime may be extended because the potential difference at the brush contact position P5 is changed gradually. Therefore, the conditions may be set as appropriate, taking into account the amount of toner discharged from the brush member 11. For example, the brush cleaning operation shown in FIG. 2 may be performed when the toner contained in the brush member 11 is small, and the brush cleaning operation shown in FIG. 3 may be performed when the toner contained in the brush member 11 is large. As an example, the brush cleaning operation in FIG. 2 may be performed during intermittent operation in which one sheet of recording material S is printed one by one, and the brush cleaning operation in FIG. 3 may be performed during continuous operation in which multiple sheets of recording material S are printed. Of course, the above conditions may be controlled by a control that predicts the amount of residual transfer toner or the like.

5. Evaluation Test

Next, the results of an evaluation test conducted to confirm the effectiveness of the present embodiment and modified example are described.

First, an evaluation test (also referred to here as "Evaluation Test 1") regarding toner staining of the charged roller 2 was conducted. Evaluation Test 1 was conducted under the following conditions. Under a temperature of 32.5° C. and relative humidity of 80% (high temperature and high humidity environment), 10 consecutive full-surface black images were printed using Xerox Vitality Multipurpose Printer Paper (trade mark, basis weight 75 g) manufactured by Xerox Corporation as the recording material S. Then, a post-rotation operation (brush cleaning operation) was executed. By continuously printing a full black image, more residual transfer toner is supplied to the brush member 11. Next, one 25% density halftone image was printed. If a large number of spotty white images of the rotation cycle of the charging roller 2 occur in this halftone image, the image is judged as "X (bad)". If a few spotty white images of the rotation cycle of the charging roller 2 occur, the image is judged as "Δ (minor, but may be a problem)," and if substantially none occur, the image is judged as "○ (OK)."

After the Evaluation Test 1 described above, an evaluation test on brush cleanability (also referred to here as "Evaluation Test 2") was also conducted. Evaluation Test 2 was conducted under the following conditions. As in Evaluation Test 1, 10 consecutive prints of an all-black image were made. After printing 10 sheets, the operation of the image forming apparatus 100 is forcibly stopped before entering the post-rotation operation, and the amount of toner accumulated on the brush member 11 at that point is vacuumed with a toner vacuum cleaner and its weight is measured to determine the "amount of toner adhered before cleaning." Then, after cleaning the brush member 11 once and removing practically all toner from the brush member 11, print 10 consecutive full black images and perform a post-rotation operation (brush cleaning operation). The amount of toner accumulated on the brush member 11 is then vacuumed using a toner vacuum cleaner, and its weight is measured to determine the "amount of toner adhered after cleaning." Then, the value obtained by subtracting the "amount of toner adhered after cleaning" from the "amount of toner adhered before cleaning" is divided by the "amount of toner adhered before cleaning," and further multiplied by 100 to obtain the value of cleaning performance (%). The higher this value of cleanability, the less toner remains on the brush member 11, the more toner is discharged from the brush member 11, and the better the cleaning is performed.

The results of the Evaluation Tests 1 and 2 described above for the present embodiment (FIG. 2) and the modified example (FIG. 3) are shown in Table 1.

TABLE 1

| | Stage discharging control | Spotty white images | Cleanability |
|---|---|---|---|
| Embodiment 1 (FIG. 2) | No | Δ | 29% |
| Modified example of Embodiment 1 (FIG. 3) | Yes | ○ | 83% |

From the results of Evaluation Test 1 in Table 1, it can be seen that in the brush cleaning operation shown in FIG. 2, because of the large potential gap of the photosensitive drum 1 as described above, the amount of toner discharged instantaneously from the brush member 11 onto the photosensitive drum 1 is large, and the charging roller 2 is contaminated with toner, resulting in some white spotting of the image. In contrast, in the brush cleaning operation shown in FIG. 3, toner is gradually discharged from the brush member 11 onto the photosensitive drum 1, as described above, so the charging roller 2 is not contaminated with toner and no white spotty images occur.

The results of Evaluation Test 2 in Table 1 also show that in the brush cleaning operation in FIG. 2, although the amount of instantaneous toner discharged is higher, the value of cleanability is relatively low (29%) because the number of times the toner is discharged is lower. On the other hand, in the brush cleaning operation in FIG. 3, although the amount of toner discharged in a single potential step is less than that in FIG. 2, the cleaning performance value is high (83%) due to the large number of times the toner is discharged.

Thus, according to the brush cleaning operation in the present embodiment, both regular charging polarity (the main charging polarity of toner during the development process) and non-regular polarity (opposite polarity to the regular polarity) toner can be accommodated, and the cleaning performance of the brush member 11 for collecting paper dust can be improved. In particular, according to the brush cleaning operation in the modified example of the present embodiment, the potential difference between the brush voltage and the post-transfer drum potential is changed gradually (stepwise in the modified example). This reduces the amount of instantaneous toner discharged from the brush member 11 onto the photosensitive drum 1 in the brush cleaning operation, suppresses toner contamination of the charging roller 2, and suppresses the occurrence of white spotty images.

Figure 9:
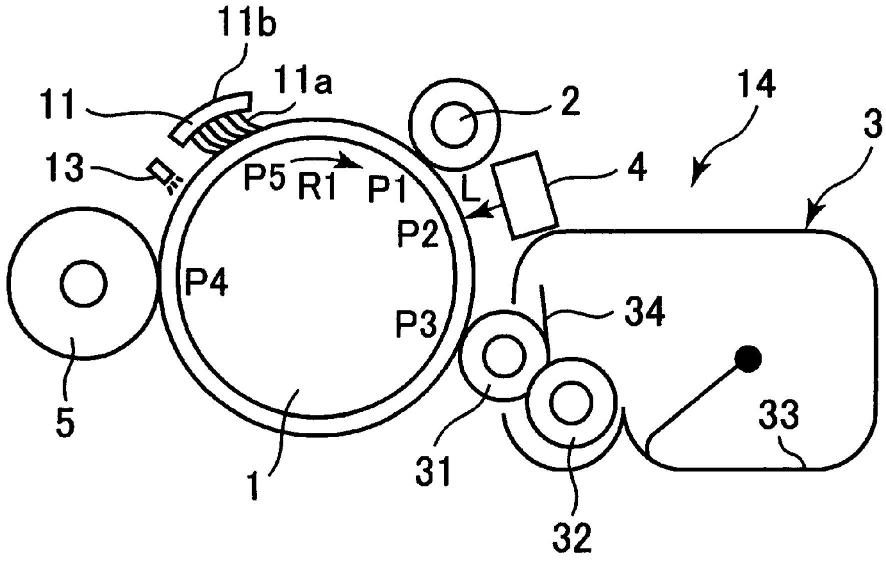
FIG. 9 is a schematic drawing showing another example of how to control the surface potential of the photosensitive drum.

In the present embodiment and the modified example, the brush voltage is kept constant at −400V, and the potential difference between the brush voltage and the post-transfer drum potential is varied by controlling the transfer voltage. However, the present invention is not limited to such an arrangement, and the potential difference between the brush voltage and the post-transfer drum potential may be varied by changing the post-transfer drum potential by other means. For example, the post-transfer drum potential may be controlled in the same manner as in the present embodiment or the modified example by controlling the charging voltage, by controlling the exposure by the exposure unit 3, or by controlling the exposure by a pre-exposure unit 13 (FIG. 9) arranged to expose the photosensitive drum 1 downstream of the transfer position and upstream of the brush contact position in the rotation direction of the photosensitive drum 1, or by a combination of these means.

In the modified example, the potential difference between the brush voltage and the post-transfer drum potential was varied gradually in order to gradually change the potential difference between the brush voltage and the post-transfer drum potential, but the potential difference may be varied continuously. In this case, it may be varied substantially continuously in a linear manner or substantially continuously in a curved manner. Although multiple potential steps as described above can be said to be advantageous in terms of improving cleaning performance, a gradual change in the potential difference between the brush voltage and the post-transfer drum potential can have the effect of suppressing toner contamination of the charging roller 2. In this case, for example, the desired cleanability can be obtained by increasing the number of times the potential difference between the brush voltage and the post-transfer drum potential is repeatedly increased or decreased as described below.

In the modified example, the voltage value of the transfer voltage applied by the constant voltage control is changed in steps, but the transfer current that flows when the transfer voltage is applied by the constant current control may be also changed in steps.

The constant-current control of the transfer voltage is a control that adjusts the output voltage of the transfer power source E4 so that the current flowing in the transfer portion (transfer member) is roughly constant at the target voltage. The same is true when the potential difference between the brush voltage and the post-transfer drum potential is changed steeply as shown in FIG. 2.

In the modified example, the potential difference between the brush voltage and the post-transfer drum potential was changed to gradually increase and then gradually decrease. However, the present invention is not limited to such an arrangement, and the method of changing the potential difference may be changed as needed. For example, the potential difference between the brush voltage and the post-transfer drum potential may be gradually decreased and then gradually increased. The potential difference between the brush voltage and the post-transfer drum potential may be changed so that the potential difference between the brush voltage and the post-transfer drum potential is gradually increased, then gradually decreased, then gradually increased again, and so on. The number of times the potential difference between the brush voltage and the post-transfer drum potential is repeatedly increased or decreased can be changed according to the desired cleanability and other factors. The same is true when the potential difference between the brush voltage and the post-transfer drum potential is changed steeply as shown in FIG. 2.

The transfer voltage value (or transfer current value) to be changed in steps may be adjusted according to endurance fluctuations and environmental fluctuations, such as changes in capacitance caused by wear of the surface layer of the photosensitive drum 1 due to repeated use, changes in electrical resistance of the transfer roller 5 due to repeated use and environmental temperature and humidity, etc. The same is true when the potential difference between the brush voltage and the post-transfer drum potential is changed steeply as shown in FIG. 2. The same applies to the adjustment of each control target when the post-transfer drum potential is changed by controlling the charging voltage, exposure by the exposure unit 3, and exposure by the pre-exposure unit 13 as described above.

Although the present embodiment and modified example describe the effect on the brush member 11 for collecting paper dust, the present invention is not limited to this. For example, a brush member for charging residual transfer toner to a predetermined polarity during an image forming operation and a brush member for collecting at least part of the residual transfer toner during an image forming operation are examples. For these applications, it may be necessary, for example, to periodically discharge toner from the brush members and clean them in order to prevent excessive accumulation of toner on the brush members. Therefore, by applying the present invention to brush members for these applications, the same effect can be obtained as in the case of the brush member 11 for paper dust collection. For example, not limited to the brush member for paper dust collection, toner contained in the brush member may scatter if the brush member undergoes a large posture change. Therefore, for example, by applying the brush cleaning operation of the modified example to brush members for other applications, the same effect can be obtained as in the case of the brush member 11 for collecting paper dust.

Thus, the image forming apparatus 100 according to the present invention has a rotatable photosensitive member 1, a charging member 2 that charges the surface of the photosensitive member 1 at the charging position P1, and an exposure unit 4 that exposes the charged surface of the photosensitive member 1 at the exposure position P2 to form an electrostatic image on the surface of the photosensitive member 1. The image forming apparatus 100 according to the present invention also has a developing unit 3 that forms a toner image on the surface of the photosensitive member 1 by supplying toner charged with regular charging polarity at the developing position P3 to the electrostatic image on the surface of the photosensitive member 1 and a transfer member 5 that transfers the toner image on the surface of the photosensitive member 1 to a subject (recording material S) at the transfer position P4. The image forming apparatus 100 according to the present invention also has a brush member 11 that contacts the surface of the photosensitive member 1 at the brush contact position P5, which is downstream from the transfer position P4 and upstream from the charging portion P1 in the rotation direction of the photosensitive member 1, and a brush voltage application portion E4 that applies brush voltage to the brush member 11. The image forming apparatus 100 according to the present invention also has a control portion 50 that controls the surface potential of the photosensitive member 1 at the brush contact portion P5, and the toner remaining on the surface of the photosensitive member 1 after the above transfer portion is collected by the developing unit 3. In the image forming apparatus 100 according to the present invention, the control portion 50 changes the contact position potential difference from a first potential difference to a second potential difference when the value of the brush voltage minus the value of the surface potential of the photosensitive member 1 at the brush contact position P5 is the contact position potential difference. Thereafter, the surface potential of the photosensitive member 1 at the brush contact position P5 is controlled so that the contact position potential difference is changed from the second potential difference to a third potential difference. The control portion 50 can perform such control when the non-image forming portion on the photosensitive member 1 passes through the brush contact position P5.

In particular, in the present embodiment (FIG. 2), the control portion 50 changes the contact position potential difference from the first potential difference to the second potential difference in the predetermined direction, which is either an increasing direction or a decreasing direction. Thereafter, the surface potential of the photosensitive member 1 at the brush contact position P5 is controlled so that the contact position potential difference is changed from the second potential difference to the third potential difference in the opposite direction of the above predetermined direction. In the present embodiment, the control portion 50 controls the surface potential of the photosensitive member 1 at the brush contact position P5 so that the sign of the contact position potential difference is both positive and negative.

In particular, in the modified example (FIG. 3), the control portion 50 changes the contact position potential difference from the first potential difference to the second potential difference in the predetermined direction, which is either an increasing direction or a decreasing direction. Thereafter, the surface potential of the photosensitive member 1 at the brush contact position P5 is controlled so that the contact position potential difference is changed from the second potential difference to the third potential difference in the above predetermined direction. In the modified example, in addition to changing the contact position potential difference from the first potential difference through the second potential difference to the third potential difference in the above predetermined direction, the control portion 50 changes the contact position potential difference from a fourth potential difference to a fifth potential difference in the opposite direction of the above predetermined direction among increasing and decreasing directions. Thereafter, the surface potential of the photosensitive member 1 at the brush contact position P5 is controlled so that the potential difference at the contact position is changed from the fifth potential difference to a sixth potential difference in the opposite direction of the above. In the modified example, the control portion 50 controls the surface potential of the photosensitive member 1 at the brush contact position P5 so that the contact position potential difference is changed in steps. However, the control portion 50 can also control the surface potential of the photosensitive member 1 at the brush contact position P5 so that the contact position potential difference is changed continuously. In the modified example, the control portion 50 controls the surface potential of the photosensitive member 1 at the brush contact position P5 so that the sign of the contact position potential difference is both positive and negative.

The control portion 50 can control the surface potential of the photosensitive member 1 at the brush contact position P5 by controlling at least one of the following: the voltage applied to the charging portion 2, the exposure of the photosensitive member 1 by the exposure unit 4, the voltage applied to the transfer portion 5, and the exposure of the surface of the photosensitive member 1 by the pre-exposure unit 13 provided to expose the surface of the photosensitive member 1 at a point downstream from the transfer position P4 and upstream from the brush contact position P5 in the rotation direction of the photosensitive member 1. In the present embodiment and the modified example, the image forming apparatus 100 has a transfer voltage applying portion E3 that applies a transfer voltage to the transfer member 5, and the control portion 50 controls the transfer voltage applying portion E3 to control the surface potential of the photosensitive member 1 at the brush contact position P5. In the present embodiment and modified example, the brush member 11 removes and collects paper dust from the surface of the photosensitive member 1. In the present embodiment and modified example, the charging member 2 contacts the surface of the photosensitive member 1 to charge its surface.

As explained above, the present embodiment can improve the cleanability of the brush member 11 for collecting paper dust. Specifically, both regular charging polarity (the main charging polarity of toner during the development process) and non-regular polarity (opposite polarity to regular polarity) toner can be accommodated, and the cleanability of the brush member 11 for collecting paper dust can be improved. Furthermore, according to the modified example of the present embodiment, by cleaning the brush member 11 without contaminating the charging roller 2 with toner, both the cleanability of the brush member 11 and the suppression of image defects caused by toner contamination of the charging roller 2 can be achieved.

Next, other embodiments of the present invention are described. The basic configuration and operation of the image forming apparatus in the present embodiment are the same as those of the image forming apparatus in Embodiment 1. Therefore, elements of the image forming apparatus in the present embodiment that have the same or corresponding functions or configuration examples as those of the image forming apparatus in Embodiment 1 are marked with the same symbols as those of the image forming apparatus in Embodiment 1, and detailed explanations are omitted.

1. Control of the Present Embodiment

Figure 6:
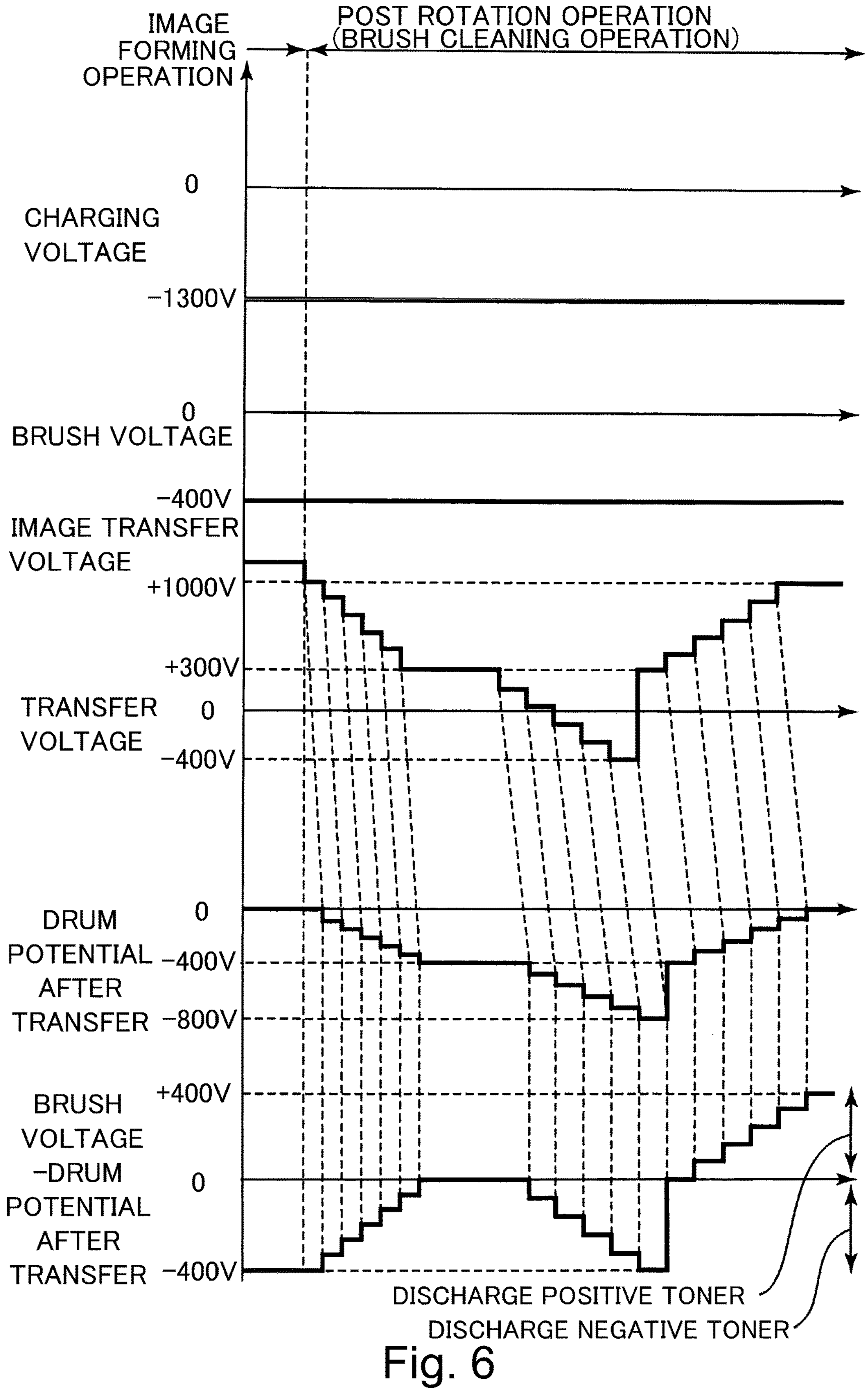
FIG. 6 is a timing chart diagram showing the control of Embodiment 2.

The brush cleaning operation in the present embodiment is described below. FIG. 6 is a timing chart diagram showing the operation of each portion in the image forming apparatus 100 of the present embodiment when the brush cleaning operation is performed in the post-rotation operation until the image forming apparatus 100 stops operating after an image forming operation (e.g., a one-sheet print operation). As in FIGS. 2 and 3, FIG. 6 shows the time transition of the charging voltage, brush voltage, transfer voltage, post-transfer drum potential, and the potential difference between the brush voltage and the post-transfer drum potential. The operation shown in FIG. 6 is controlled by the control portion 50, which sends control signals to each power supply portion. As in Embodiment 1 and the modified example of Embodiment 1, in the present embodiment, the transfer voltage is controlled at a constant voltage.

The operation of each portion of the photosensitive drum 1 in the present embodiment shown in FIG. 6, from the start of the rotational drive of the photosensitive drum 1 to the end of the image forming operation, is the same as that shown in FIGS. 2 and 3.

In the present embodiment, first, after the transition to the post-rotation operation (brush cleaning operation), the post-transfer drum potential is changed in a stepwise manner to become equal to the brush voltage. Then, the transfer voltage is controlled so that the potential difference in negative polarity between the brush voltage and the post-transfer drum potential gradually changes in the increasing direction. Thereafter, the post-transfer drum potential is changed so that it becomes equal to the brush voltage. Thereafter, the transfer voltage is controlled so that the potential difference of positive polarity between the brush voltage and the post-transfer drum potential gradually changes in the increasing direction.

In the modified example of Embodiment 1, with respect to the discharging of positive toner, which is the main discharging target in the brush cleaning operation, there is a period during which the absolute value of the potential difference between the brush voltage and the post-transfer drum potential is changed in the decreasing direction. This is the period when the potential difference between the brush voltage and the post-transfer drum potential in FIG. 3 changes from +400V to 0V. In contrast, in the present embodiment, the potential difference between the brush voltage and the post-transfer drum potential changes in the direction that its absolute value increases in relation to the discharging of positive toner, which is the main discharging target in the brush cleaning operation. This is the period when the potential difference between the brush voltage and the post-transfer drum potential in FIG. 6 changes from 0V to +400V. In addition, with respect to the discharging of negative toner, there is also a period during which the absolute value of the potential between the brush voltage and the post-transfer drum potential changes in the increasing direction. This is the period during which the potential difference between the brush voltage and the post-transfer drum potential changes from 0V to −400V.

2. Evaluation Test

Next, the results of the evaluation tests conducted to confirm the effectiveness of the present embodiment are described. Here, the aforementioned evaluation tests 1 and 2 were conducted. The results of the evaluation tests 1 and 2 for the present embodiment are shown in Table 2, together with the results for the modified example of Embodiment 1. The evaluation method for evaluation tests 1 and 2 is the same as that described above, but the case where the spotty white images in the rotation cycle of the charging roller 2 were better suppressed was judged to be "◎ (better)."

TABLE 2

| | Stage discharging control | Potential difference change Negative discharging/positive discharging | Spotty white images | Cleanability |
|---|---|---|---|---|
| Modified example of Embodiment 1 | Yes | Decrease/increase | ○ | 83 % |
| Embodiment 2 | Yes | Increase/increase | ◎ | 80% |

The results in Table 2 show that the present embodiment obtained better results than the modified example of Embodiment 1 for evaluation test 1 (toner staining of the electrically charged roller 2). In addition, in the present embodiment, a similar result to the modified example of Embodiment 1 was obtained for evaluation test 2 (cleanability).

The results show that in the present embodiment, contamination by toner on the charging roller 2 in the brush cleaning operation was further suppressed than in the modified example of Embodiment 1. This is considered to be because a smaller amount of toner is discharged from the brush member 11 onto the photosensitive drum 1 in the present embodiment than in the modified example of Example 1, for the following reasons. In the present embodiment, for both negative and positive toner, there is a period of time in which the absolute value of the potential difference between the brush voltage and the post-transfer drum potential of both negative and positive polarity gradually increases from the post-transfer drum potential, which is the same as the brush voltage, respectively. In particular, in the present embodiment, with respect to the discharging of positive toner, which is the main discharging target in the brush cleaning operation, the potential difference between the brush voltage and the post-transfer drum potential has a period during which its absolute value changes in the increasing direction, but not in the decreasing direction. Here, the larger the absolute value of the potential difference between the brush voltage and the post-transfer drum potential, the more advantageous it is for discharging, but the absolute value should change from a small value to a large value. In other words, when the absolute value of the potential difference is smaller than when it is larger, the toner accumulated on the brush member 11 is preferentially selected from those that are easy to move in terms of toner particle size, toner charge amount, and adhesion with the brush member 11, and moved onto the photosensitive drum 1. By gradually increasing the absolute value of the potential difference from a small value, a small amount of toner can be discharged from the toner that easily moves from the brush member 11 onto the photosensitive drum 1. On the contrary, if the absolute value of the potential difference is gradually reduced from a large value, the instantaneous amount of toner discharged onto the photosensitive drum 1 may increase at the stage where the absolute value of the potential difference is large. In the modified example of Embodiment 1, such a potential relationship is observed during the period when the potential difference between the brush voltage and the post-transfer drum potential in FIG. 3 changes from +400V to 0V. In contrast, in the present embodiment, there is no such period of potential relationship. Therefore, in the present embodiment, the amount of instantaneous toner discharging can be further suppressed than in the modified example of Embodiment 1.

On the other hand, in the present embodiment, the transfer voltage must be adjusted so that the post-transfer drum potential is equal to the brush voltage. This is relatively easy if there is a means to measure the drum potential within the image forming apparatus 100. However, if there is no means of measuring the drum potential, it is necessary to set the transfer voltage such that the post-transfer potential is equivalent to the brush voltage, taking into account fluctuations in the drum potential due to environmental temperature and humidity, electrical resistance of the transfer roller 5, and changes in the capacitance of the photosensitive drum 1. In contrast, in the modified example of Embodiment 1, it is not necessary to know the value of the transfer voltage at which the brush voltage and the post-transfer drum potential become the same level. Therefore, the control in the modified example of Embodiment 1 is simpler than the control of the present embodiment.

Thus, in the present embodiment, the control portion 50 controls the surface potential of the photosensitive member 1 at the brush contact position P5 so that during the period when the sign of the contact position potential difference becomes the opposite sign of the regular polarity of the toner, the contact position potential difference is changed in the direction where the absolute value of the contact position potential difference increases.

As explained above, according to the present embodiment, it is possible to further suppress the instantaneous discharging of more toner from the brush member 11 than in the modified example of Embodiment 1, and to further suppress the contamination of the charging roller 2 by toner in the brush cleaning operation.

The present invention has been explained in accordance with the specific embodiments described above. The dimensions, materials, shapes, and relative arrangements of the components described in the above embodiments should be changed according to the configuration of the device to which the invention is applied and various other conditions. In other words, it is not intended to limit the scope of the present invention to the above embodiments.

In the present embodiment, a printer is illustrated as an image forming apparatus, but the present invention is not limited to this type of apparatus. The present invention can be applied to other image forming apparatuses such as copiers, facsimile machines, or other image forming apparatuses such as multifunctional machines combining these functions, and the same effect can be obtained as in the embodiment above. In the present embodiment, the image forming apparatus is a monochrome image forming apparatus, but the present invention can also be applied to a color image forming apparatus, and the same effects as in the above example can be obtained. The color image forming apparatus may be a tandem-type image forming apparatus equipped with a plurality of photosensitive members. The tandem type image forming apparatus is well known for its intermediate transfer method, in which a toner image is transferred from a plurality of photosensitive members to an intermediate transfer member by primary transfer to a recording material by secondary transfer, and for its direct transfer method, in which a toner image is transferred directly from a plurality of photosensitive members to a recording material carried on a recording material carrier. In image forming apparatuses that use an intermediate transfer member (intermediate transfer belt) as the transfer means, paper dust may adhere to the photosensitive member via the intermediate transfer member, so it is conceivable that a paper dust removal member be provided to remove paper dust from the photosensitive member.

According to the present invention, the cleanability of the brush member positioned in contact with the photosensitive member can be improved.

Image Forming Apparatus

Figure 10:
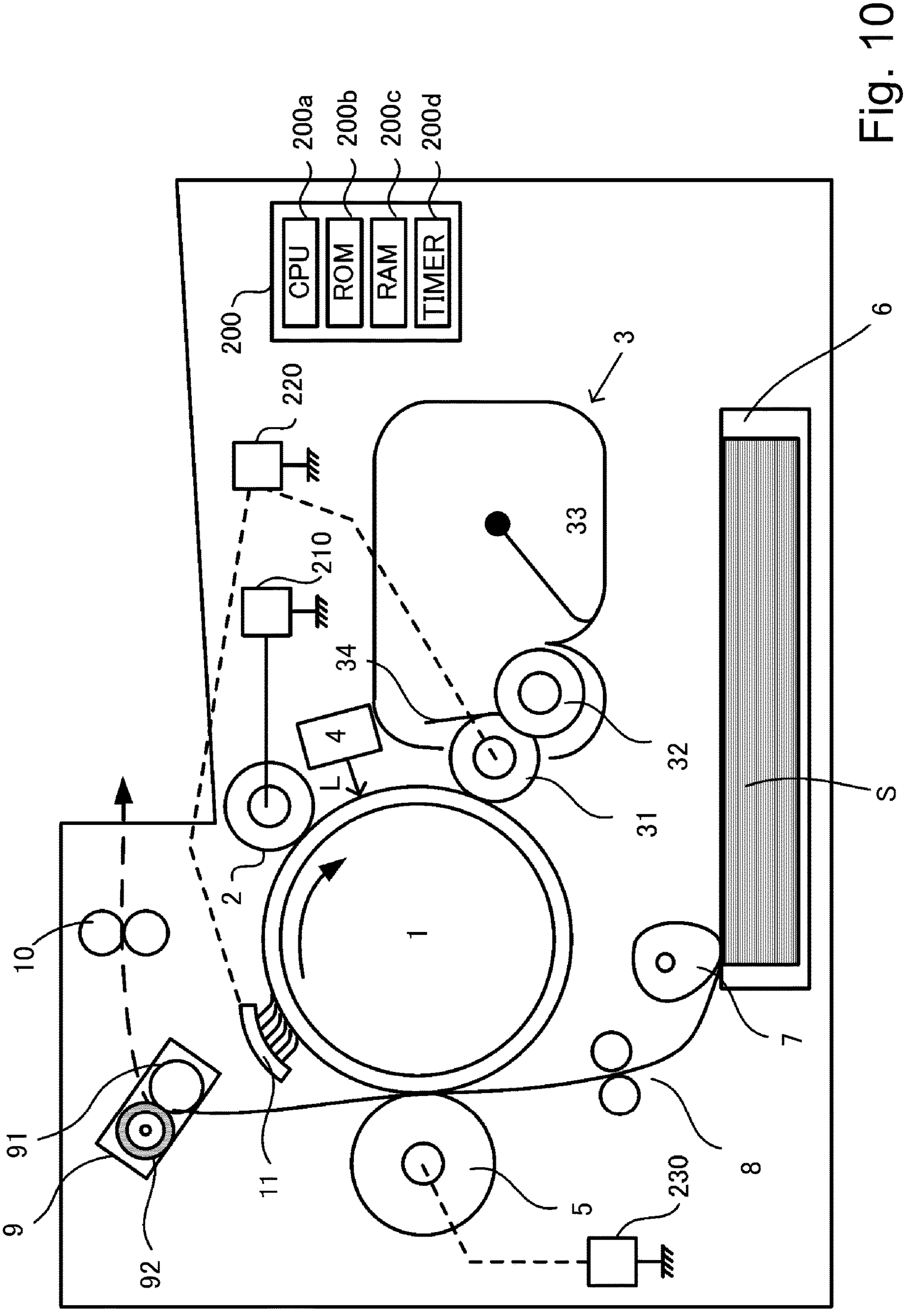
FIG. 10 is a schematic cross-sectional drawing showing the image forming apparatus according to Embodiment 3.

FIG. 10 is a schematic drawing of the configuration example of the image forming apparatus according to Embodiment 3. The image forming apparatus in Embodiment 3 is a monochrome printer. The image forming apparatus has a cylindrical photosensitive member, or photosensitive drum 1, as an image carrier. Surrounding the photosensitive drum 1 are a charging roller 2 as a charging means and a developing unit 3. Between the charging roller 2 and developing roller 3, there is an exposure unit 4 as an exposure means. In addition, a transfer roller 5 as a transfer means is pressed against the photosensitive drum 1.

The photosensitive drum 1 is a negatively charged organic photosensitive member. The outer diameter of the photosensitive drum 1 is, for example, 24 mm. The photosensitive drum 1 has a photosensitive layer on a grounded aluminum drum-like substrate, and is driven by a drive unit (not shown) in the direction of the arrow in the Figure (clockwise direction) at a specified process speed. The process speed corresponds to the circumferential speed of the photosensitive drum 1 (surface moving speed of the photosensitive drum 1).

The charging roller 2 contacts the photosensitive drum 1 with a predetermined pressure contact force to form a charging portion. The charging roller 2 is subjected to a predetermined charging voltage by the charging high voltage power source 210 as the first means of applying the charging voltage, and the surface of the photosensitive drum 1 is uniformly charged to a predetermined potential. The photosensitive drum 1 is charged with negative polarity, for example, by the charging roller 2.

The exposure unit 4 is, for example, a laser scanner unit, which outputs a laser beam L corresponding to image information input from an external device such as a host computer, and scans and exposes the surface of the photosensitive drum 1. This exposure forms an electrostatic latent image (electrostatic image) on the surface of the photosensitive drum 1 in accordance with the image information. The exposure unit 4 is not limited to a laser scanner device, but may employ, for example, an LED array in which a plurality of light emitting diodes (LEDs) are arranged along the longitudinal direction of the photosensitive drum 1.

For example, a contact development method is used as a developing method. The developing unit 3 has a developing roller 31 as a developer carrier, a toner supplying roller 32 as a developer supplying means, a developer compartment 33 that contains toner, and a developing blade 34. Toner supplied to the developing roller 31, the developing means, by the toner supplying roller 32 from the developer compartment 33 is charged to a predetermined polarity as it passes through the contact portion with the developing blade 34. In Embodiment 3, for example, a toner with a particle diameter of 6 μm and a regular charging polarity of negative polarity is used. Although a single-component non-magnetic contact development method is employed in Embodiment 3, a two-component non-magnetic contact/non-contact development method may be used, or a magnetic development method may be employed.

The electrostatic latent image formed on the photosensitive drum 1 (on the image carrier) is developed as a toner image (developer image) by the toner (developer) fed by the developing roller 31 in the developing portion between the developing roller 31 and the photosensitive drum 1. At this time, a developing voltage is applied to the developing roller 31 by the developing high voltage power source 220 as the second applying means for applying a developing voltage. In Embodiment 3, for example, the electrostatic latent image is developed by the inverted development method. In other words, the electrostatic latent image is developed as a toner image by adhering toner charged with the same polarity as that of the photosensitive drum 1 to the portion of the photosensitive drum 1 that has lost its electric charge due to exposure after the charging process.

The transfer roller 5 can suitably be made of an elastic member such as sponge rubber made of polyurethane rubber, EPDM (ethylene propylene diene rubber), NBR (nitrile butadiene rubber), or the like. The transfer roller 5 is pressed toward the photosensitive drum 1 to form a transfer portion where the photosensitive drum 1 and the transfer roller 5 are in a pressurized contact. The transfer roller 5 is connected to a transfer high voltage power source 230 as a fourth application means for applying a transfer voltage, and a predetermined voltage is applied at a predetermined timing.

At the timing when the toner image formed on the photosensitive drum 1 reaches the transfer portion, the recording material S stored in a paper cassette 6 is fed by a paper feeding unit 7 as the recording material, and is fed through a registration (hereinafter referred to as "resistor") roller pair 8 and fed to the transfer portion. The toner image formed on the photosensitive drum 1 is transferred onto the recording material S by the transfer roller 5 to which a predetermined transfer voltage is applied by the transfer high voltage power source 230. The image forming apparatus has a brush member 11 (collection member) that is a contact member as a paper dust removal mechanism. The brush member 11 is described below.

After the unfixed toner image has been transferred, the recording material S is fed to a fixing unit 9. The fixing unit 9 is a film fixing method fixing unit equipped with a fixing film 91 and a pressure roller 92. The fixing film 91 incorporates a fixing heater (not shown) and a thermistor (not shown) that measures the temperature of the fixing heater. The pressure roller 92 presses against the fixing film 91. The recording material S is heated and pressurized by the fixing unit 9 to fix the toner image and is discharged from the apparatus through an discharging roller pair 10.

The image forming apparatus is equipped with a control portion 200 that controls the entire image forming apparatus, including image forming operations, feeding operations of the recording material S, cleaning operations of the brush member 11 (hereinafter referred to as "brush cleaning"), etc., by controlling the various portions described above. The control portion 200 has, for example, a CPU 200*a*, which executes programs stored in a ROM 200*b* while using a RAM 200*c* as a temporary work area, with the timing controlled by a timer 200*d*.

Removal of Residual Transfer Toner

The toner that remains on the photosensitive drum 1 without being transferred to the recording material S (hereinafter referred to as "residual transfer toner") is removed in the following process. The residual transfer toner is a mixture of positively charged toner and negatively charged toner that does not have sufficient charge. The residual transfer toner is charged to negative polarity again by discharge in the charging portion. The residual transfer toner that has been charged with negative polarity again in the charging portion reaches the developing portion as the photosensitive drum 1 rotates. Here, an electrostatic latent image is formed on the photosensitive drum 1 that has reached the developing portion. The behavior of the residual transfer toner that has reached the developing portion is described separately for the exposure portion (in other words, the image forming portion) and the non-exposure portion (in other words, the non-image forming portion) of the photosensitive drum 1.

Non-Image Forming Portion (Non-Exposure Portion)

The residual transfer toner adhering to the non-image forming portion of the photosensitive drum 1 is transferred to the developing roller 31 by the potential difference between the potential of the non-image forming portion of the photosensitive drum 1 (hereinafter referred to as the non-image forming portion potential) and the developing voltage in the developing portion, and is collected (stored) in the developer compartment 33, which is the storage portion. The toner collected in the developer compartment 33 is used again for image formation. In this manner, the control portion 200 controls the developing voltage applied by the developing high voltage power source 220 to collect the developer remaining on the photosensitive drum 1 without being transferred to the recording material S by the transfer roller 5 through the developing roller 31 into the developer compartment 33.

Image Forming Portion (Exposure Portion)

On the other hand, the residual transfer toner adhering to the exposure portion (image forming portion) of the photosensitive drum 1 is not transferred from the photosensitive drum 1 to the developing roller 31 in the developing portion, but is transferred to the transfer portion together with the toner developed from the developing roller 31 to the recording material S, where it is removed from the photosensitive drum 1.

Brush Member 11

Next, the paper dust removal mechanism of Embodiment 3 is described. As shown in FIG. 10, the image forming apparatus has a brush member 11 (collection member) as a paper dust removal mechanism. The brush member 11 has a pile string, which is a plurality of bristles that rub the surface of the photosensitive drum 1, and a base fabric that supports the pile string, as described below in detail. The brush member 11 is arranged to contact the photosensitive drum 1 downstream from the transfer portion and upstream from the charging portion in the moving direction (rotation direction) of the photosensitive drum 1. The brush member 11 is supported by a support member (not shown) and is positioned in a fixed position with respect to the photosensitive drum 1, and it slides over the surface of the photosensitive drum 1 as the photosensitive drum 1 moves.

The brush member 11 collects, together with toner, adhesion materials such as, for example, paper dust transferred from the recording material S onto the photosensitive drum 1 in the transfer portion. The brush member 11 reduces the amount of paper dust that moves to the charging portion and developing portion downstream of the brush member 11 in the moving direction (rotation direction) of the photosensitive drum 1. The brush member 11 uses the developing high voltage power source 220 as a third applying means to apply the brush voltage. In other words, the second and third applying means are common power sources, and the same voltage as the developing voltage applied to the developing roller 31 is applied to the brush member 11 as the brush voltage. The brush cleaning control described below is not limited to the configuration in which brush voltage is applied to the brush member 11 from the developing high voltage power source 220. A third applying means for applying brush voltage to the brush member 11 may be provided separately from the developing high voltage power source 220.

Nylon is used as the binder material for the pile string of the brush member 11 in Embodiment 3, and conductive nylon fiber mixed with carbon is used as the conductive material, but it is not limited to these materials. For example, even if the binder material is polyester or acrylic, it can be used in the same way as long as it is conductive. The length of the brush member 11 in the diameter direction of the photosensitive drum 1 (hereinafter referred to as the shorthand direction) is set to 5 mm, for example, but is not limited to this. For example, it may be changed according to the amount of paper dust that increases with the lifetime of the image forming apparatus or process cartridge.

The pile length of the brush member 11 is 5 mm, for example, but is not limited to this. However, when the brush member 11 is used to collect paper dust, it is necessary to secure a certain amount of penetration of the brush member 11 into the photosensitive drum 1, because if the pile length is too short, contact pressure against the photosensitive drum 1 becomes stronger, and the surface of the photosensitive drum 1 may be damaged by the friction. Therefore, it is desirable that the pile length of the brush member 11 be 4 mm or longer. The length of the brush member 11 in the longitudinal direction is set at 230 mm, for example, but is not limited to this. For example, it may be changed according to the maximum paper width of the image forming apparatus. Here, the paper width refers to the length of the recording material S in the direction perpendicular to the feeding direction of the recording material S, in other words, in the longitudinal direction of the photosensitive drum 1. The image forming apparatus is capable of forming images on recording material S of various paper widths, and the longest of the various paper widths is referred to as the maximum paper feeding width (maximum paper width).

The fineness of the brush member 11 is, for example, 2d, but is not limited to this. Here, a fineness of 2d means that each fiber weighs 2 g per 9000 m. However, a high fineness is undesirable because the fibers are stiff and the contact pressure with the photosensitive drum 1 becomes stronger, and the surface of the photosensitive drum 1 may be damaged by the friction. Therefore, a fineness of 6 d or less is desirable. The density of the brush member 11 is 240 kF/inch$^2$, for example, but is not limited to this. Here, "kF/inch$^2$" is a unit for brush density and indicates the number of filaments per square inch. However, when the brush member 11 is used for collecting paper dust, a low density increases the possibility of paper dust slipping through. Therefore, a density of 120 kF/inch$^2$ or higher is desirable.

The penetration of the brush member 11 is set at 1.5 mm, for example, but is not limited to this. However, when the brush member 11 is used to collect paper dust, a small penetration of the brush member 11 into the photosensitive drum 1 increases the possibility of paper dust slipping through. Therefore, a penetration of 1 mm or more is desirable. The electrical resistance of the brush member 11 is 1.0×105Ω when measured as follows. That is, the brush member 11 was fixed to the aluminum cylinder with the brush member 11 entering 1 mm from the leading end of the pile in the direction of the pile length of the brush member 11. The electrical resistance of the brush member 11 was measured by applying a voltage of 50V to the brush member 11 while the aluminum cylinder was rotated at 50 mm/sec. However, the electrical resistance of the brush member 11 is not limited to this, and brushes with a high resistance of approximately 1.0×108 Ω may be used.

Brush Cleaning Control Using Transfer Rollers

Figure 11:
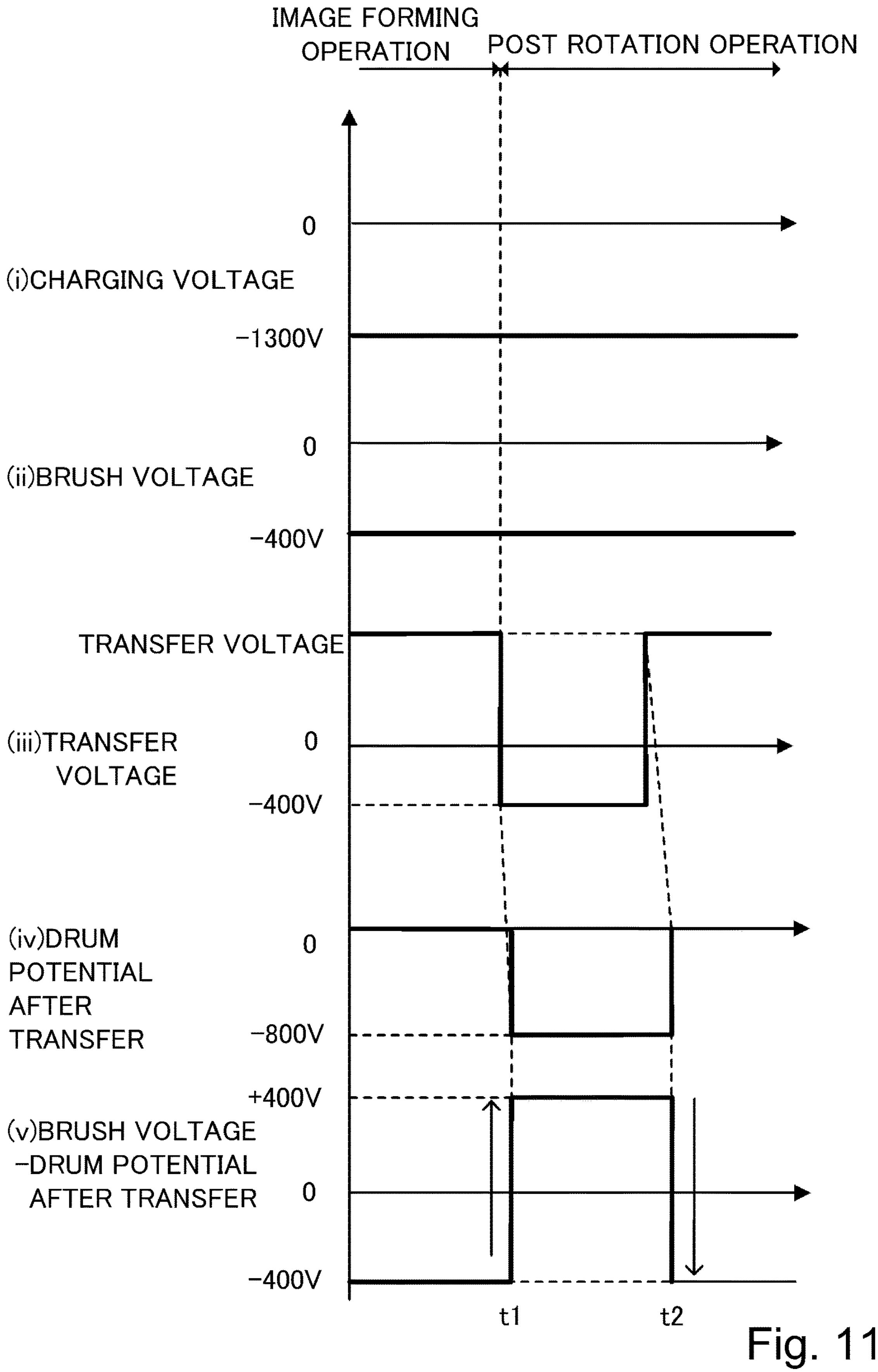
FIG. 11 is a drawing of the conventional cleaning control using the transfer roller for a comparative example with Embodiment 3.

Next, an example of brush cleaning control during non-image forming operation is explained using FIG. 11. The brush cleaning control is performed by the control portion 200 controlling each of the above-mentioned application means. FIG. 11 shows the brush cleaning control performed during the period between the image forming operation and the termination of the operation (hereinafter referred to as "post-rotation operation") in a conventional image forming apparatus. (i) shows the charging voltage applied to the charging roller 2 from the charging high voltage power source 210, and (ii) shows the brush voltage applied to the brush member 11 from the conventional brush high voltage power source (not shown). (iii) shows the transfer voltage applied to the transfer roller 5 from the transfer high voltage power source 230, and (iv) shows the surface of the photosensitive drum 1 after transfer (hereinafter called "post-transfer") by the transfer roller 5 to which the transfer voltage is applied (hereinafter called "drum potential"). (v) indicates the difference between the brush voltage and the post-transfer drum potential, i.e., the potential difference (brush voltage-post-transfer drum potential). Both horizontal axes indicate time.

A charging voltage of, for example, −1300V is applied to the charging roller 2, which uniformly charges the drum potential to about −800V in the longitudinal direction. In addition, a value of −400V, for example, which is approximately halfway between the drum potential of −800V in the non-image forming portion and the drum potential of 0 to −100V in the image forming portion, is applied to the brush member 11. This setting prevents image defects caused by electrical discharge between the brush member 11 and the photosensitive drum 1. By taking the potential between the drum potential of the non-image forming portion and the drum potential of the image forming portion, toner is discharged onto the photosensitive drum 1 side by adjusting the drum potential for toner of both negative and positive polarity accumulated on the brush member 11. Furthermore, for image forming portions where the drum potential is approximately 0 to −100V, the potential relationship is such that the negative polarity toner contained in the residual transfer toner (hereinafter referred to as "negative toner") is allowed to pass through the brush member 11 without being adhered to it. This prevents excessive accumulation of toner on the brush member 11 (hereinafter referred to as "over-accumulation").

After timing t1, when the operation is shifted from the image forming operation to the post-rotation operation, −400V, for example, is applied to the transfer roller 5 as a voltage within the range that does not drop the drum potential due to discharge against the drum potential of −800V in the non-image forming portion. This increases the difference between the brush voltage and the post-transfer drum potential without dropping the post-transfer drum potential, and the magnitude of the potential difference causes the positive polarity toner accumulated in the brush member 11 (hereinafter referred to as "positive toner") to be discharged onto the photosensitive drum 1 side. Next, at timing t2, a transfer voltage of, for example, +1000V is applied to the transfer roller 5 to drop the post-transfer drum potential to about 0V. This increases the difference between the brush voltage and the post-transfer drum potential to the opposite side (−400V) of the above-mentioned potential difference (+400V), and the negative toner is discharged from the brush member 11 onto the photosensitive drum 1 side. By the above operation, the positive toner and negative toner accumulated in the brush member 11 are discharged onto the photosensitive drum 1.

Action of Brush Cleaning Control

Figure 12:
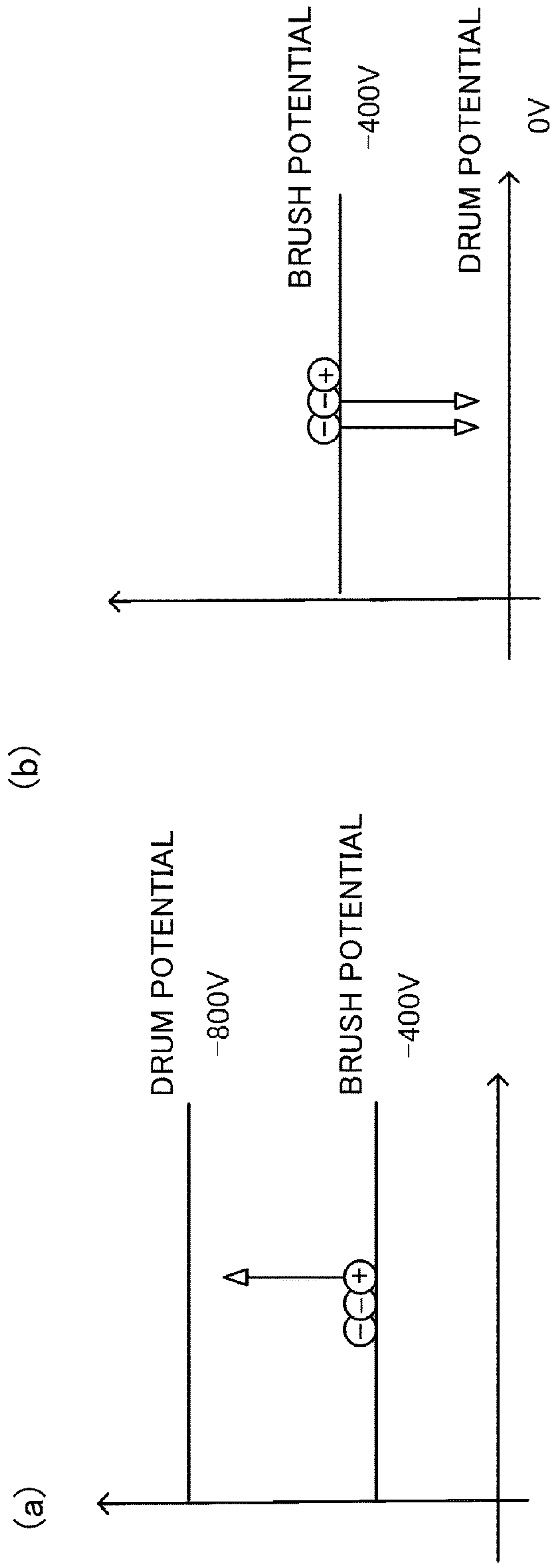
FIG. 12, part(a) and part(b), is a drawing of the behavior of toner accumulated on the brush member in Embodiment 3.

By increasing the potential difference between the brush member 11 and the drum potential, toner is discharged from the brush member 11 onto the photosensitive drum 1. FIG. 12 shows how the toner is discharged from the brush member 11 onto the photosensitive drum 1, with the vertical axis representing the potential and the horizontal axis representing the position. In FIG. 12 (*a*), the drum potential is −800V and the brush voltage is −400V, corresponding to timing t1 to timing t2 in FIG. 11. Thus, if the absolute value of the drum potential is higher than the absolute value of the brush voltage (|−800|V>|−400|V), positive toner is discharged from the brush member 11 onto the photosensitive drum 1. On the other hand, in FIG. 12 (*b*), the drum potential is 0V and the brush voltage is −400V, corresponding to timing t2 or later in FIG. 11. Thus, if the absolute value of the drum potential is lower than the absolute value of the brush voltage (|0|V<|−400|V), negative toner is discharged. Thus, by changing the potential difference between the brush voltage of the brush member 11 and the drum potential to both positive and negative relative to the brush voltage, both negative and positive toner can be discharged.

Negative Toner

In the charging portion where the charging roller 2 contacts the photosensitive drum 1, the electrostatic force exerted on the negative toner is relatively greater toward the photosensitive drum 1 than toward the charging roller 2 due to the potential difference between the charging voltage (−1300V) and drum potential (−800V). Therefore, the negative toner discharged from the brush member 11 passes through the contacting area between the photosensitive drum 1 and the charging roller 2 (hereinafter referred to as the charging contacting area). The negative toner that has passed through the charging roller 2 due to the rotation of the photosensitive drum 1 heads for the developing roller 31 and the developing portion. At the developing roller 31 and the photosensitive drum 1, the electrostatic force exerted on the negative toner is relatively larger than the force toward the developing roller 31 due to the potential difference between the developing potential (−400V) and the drum potential (−800V). Therefore, the negative toner discharged from the brush member 11 is pulled by the developing roller 31 at the contact portion between the photosensitive drum 1 and the developing roller 31 and collected in the developer unit (developer compartment 33).

Positive Toner

A discharge occurs at the contacting portion between the photosensitive drum 1 and the charging roller 2. The positive toner discharged from the brush member 11 is affected by this discharge and becomes negative toner by being charged with negative polarity, and is collected in the developer unit through the same process as the negative toner described above.

As explained so far, this brush cleaning control controls the drum potential through the transfer roller 5 by controlling the transfer voltage, and cleaning is performed using the potential difference between the drum potential and the brush voltage. Therefore, cleaning is performed by this brush cleaning control only in the area corresponding to the longitudinal direction length of the transfer roller 5 (hereinafter referred to as the width of the transfer roller 5).

Generally, the transfer member only needs to have a width of the maximum image forming area, and from the viewpoint of cost reduction, the width should be as short as possible. Here, the image forming area refers to the area where the toner image is formed in the width direction, and the maximum image forming area is the longest toner image to be formed in the width direction, i.e., the area corresponding to the maximum paper width. On the other hand, the width of the opening of the developer compartment 33 where the developing roller 31 is installed (hereinafter referred to as "developing opening width") should be longer than the maximum paper width. This is because if the developing opening width is wider than the image forming area but narrower than the paper width, a difference in toner density may occur on the paper at the boundary of the area corresponding to the developing opening width (hereinafter referred to as the developing opening area). The amount of toner coated on the developing roller 31 differs between the developing opening area and the non-developing opening area. This is because the amount of toner coated on the photosensitive drum 1 in contact with the developing roller 31 also differs between the developing opening area and non-developing opening area, and this is transferred onto the paper. The brush member 11 needs to be longer than the maximum paper width from the viewpoint of paper dust collection, and should be longer than the developing opening to prevent foreign matter from plunging into the developing opening portion.

Configuration of Embodiment 3

Figure 13:
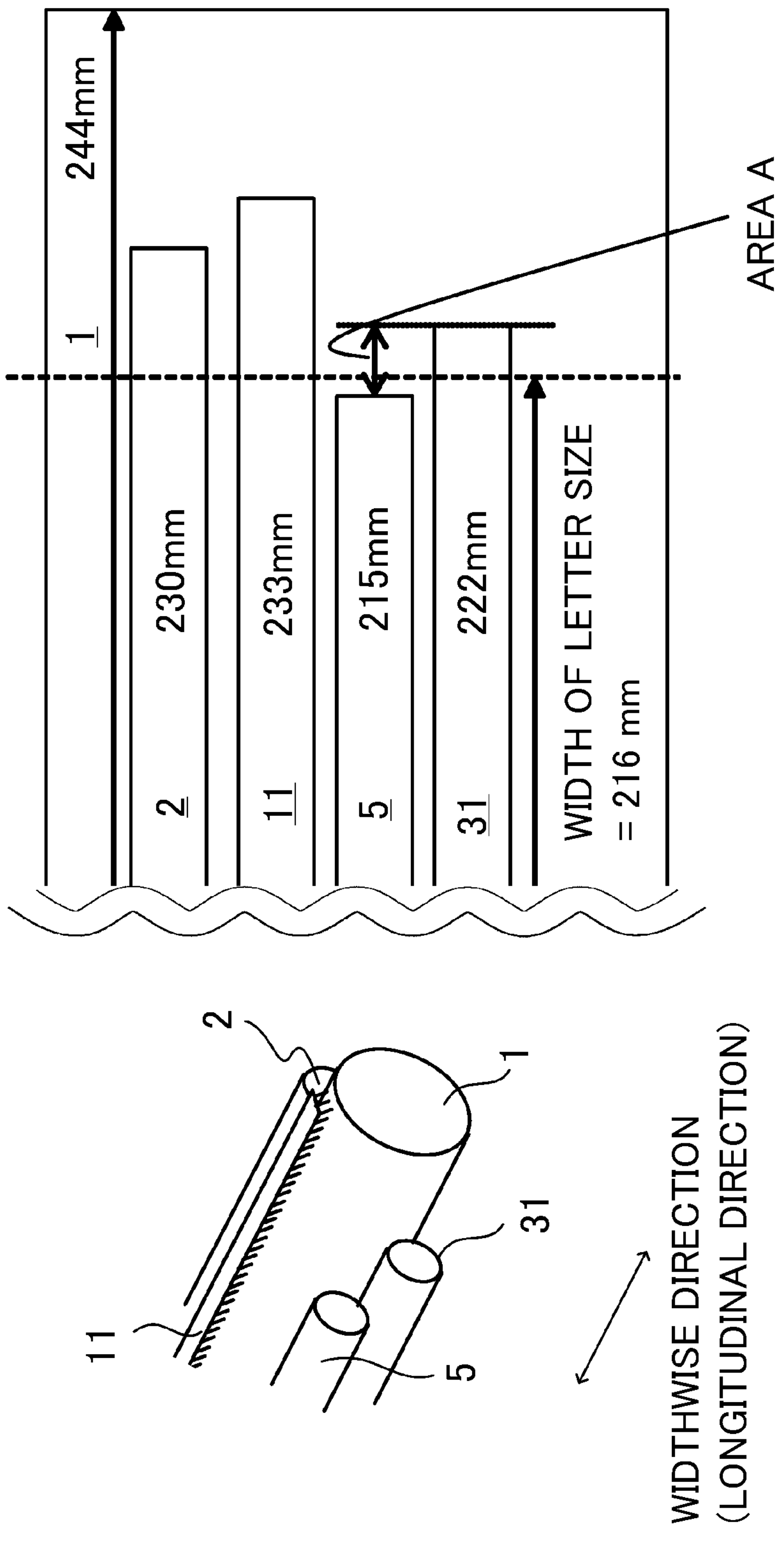
FIG. 13 is a drawing of the lengths of the photosensitive drum and the member in contact with the photosensitive drum in Embodiment 3.

The length of each member in the longitudinal direction in Embodiment 3 is shown in FIG. 13. The left side of FIG.

13 is a schematic drawing of the main parts of the photosensitive drum 1 and the member in contact with the photosensitive drum 1, and the right side shows the relationship between the lengths at one end of the longitudinal direction. In Embodiment 3, the recording material S is fed in the center in the width direction, and the members in contact with the photosensitive drum 1 are all arranged so that they are linearly targeted in the width direction with respect to the center. In the configuration shown in FIG. 10, the photosensitive drum 1, charging roller 2, developing roller 31, transfer roller 5, and brush member 11, which are in contact with the photosensitive drum 1, are shown so that the length relationship in the longitudinal direction can be understood. However, the developing roller 31 shows the length of the developing opening portion of each roller where the toner is on the developing roller 31 (on the developing means). In FIG. 13, the length (width) of letter-size paper assumed as the maximum paper width is also shown. For example, the width of the photosensitive drum 1 is 244 mm, and the width of the letter-size paper (dashed line) is 216 mm. The charging roller 2 is longer than the letter-size paper and shorter than the photosensitive drum 1, 230 mm. The brush member 11 is 233 mm, longer than the charging roller 2 and shorter than the photosensitive drum 1. The transfer roller 5 is 215 mm, shorter than the letter size paper. The developing opening width of the developing roller 31 is 222 mm, longer than the letter size paper and shorter than the brush member 11.

In Embodiment 3, the longitudinal lengths of the photosensitive drum 1 and each member in contact with the photosensitive drum 1 are, in order of shortest to longest, the transfer roller 5, the developing opening width in the developing roller 31, the charging roller 2, and the brush member 11. In other words, there is an area near the end of the brush member 11 that is outside of the transfer roller 5 and inside of the developing opening portion of the developing roller 31. Such an area is defined as area A. In area A, brush cleaning using the transfer roller 5 as described above cannot be performed, and negative toner always accumulates on the brush member 11 as shown in FIG. 12 (*a*). The location of area A is shown in FIG. 13.

Brush Cleaning Control in Embodiment 3

Figure 14:
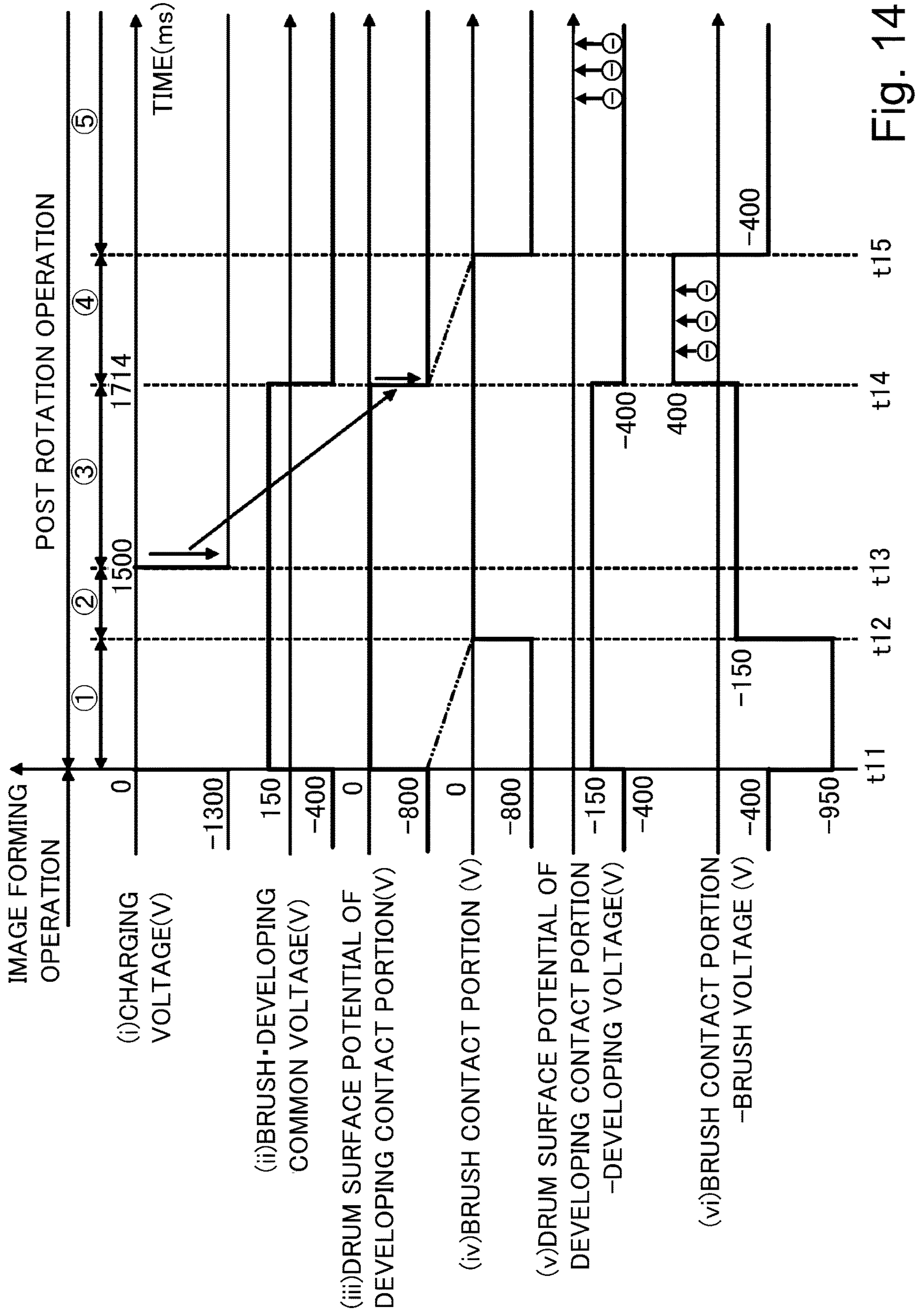
FIG. 14 is a drawing of the brush cleaning control in Embodiment 3.

The various types of potential control in Embodiment 3 are explained using FIG. 14. The cleaning control in Embodiment 3 is performed by the control portion 200 controlling each of the above-mentioned application means. FIG. 14 shows the post-rotation operation after a single print operation in area A corresponding to the edge of the brush member 11 shown in FIG. 13 in the image forming apparatus of Embodiment 3. The process from the start of the rotation drive of the photosensitive drum 1 to the image forming operation is the same as in the conventional case. The horizontal axis in FIG. 14 shows time (ms), and the vertical axis shows the applied voltage, etc. to each component. Specifically, (i) shows the charging voltage (V), and (ii) shows the brush/developer common voltage (V), where the brush voltage and the developer voltage are common. (iii) indicates the surface potential of the photosensitive drum 1 (hereinafter referred to as the drum surface potential) (V) at the contacting portion between the developing roller 31 and the photosensitive drum 1 (hereinafter referred to as the developing contacting portion). (iv) shows the surface of the photosensitive drum potential (V) at the contact area between the brush member 11 and the photosensitive drum 1 (hereinafter referred to as the brush contact area). (v) shows the potential difference (V) between the drum surface potential and the developing voltage at the developing portion. (vi) shows the potential difference (V) between the drum surface potential and the brush voltage at the brush contact area. Time (0, 1500, 1714, etc.) shows an example when the process speed is 139.67 mm/sec.

For simplicity, the time required to switch the voltage applied to each member is not taken into account in FIG. 14, and thus the voltage is assumed to change in a rectangular shape during switching. The change in the surface potential of the drum is also outlined as a rectangle without considering the effects of natural attenuation and other factors. Although these simplifications may result in parts of the waveforms that do not exactly match the actual waveforms, the order in which the voltage is switched for each member remains the same, and the details of what criteria should be used to determine the switching timing will be described appropriately.

(Period 1)

The control after the transition from image forming control to post-rotation control at timing t11 is described in chronological order as indicated by round numeral 1 through round numeral 5 in FIG. 14. Hereafter, period round numeral 1, etc. will be simply referred to as period 1, etc. In switching to period 1 at timing t11, when the image forming operation is completed and the post-rotation operation is started, the common voltage for the developer and brush is changed from −400V, which is the voltage during the image forming operation, to 150V. The charging voltage is changed from −1300V to 0V, which is the voltage in the image forming operation. By changing the applied voltage in the brush contact portion (and developing contact portion) and charging portion, the surface of the photosensitive drum potential, which was −800V during image forming, changes from −800V to the positive side due to the discharge between the developing roller 31 and the photosensitive drum 1 when the drum passes through the developing contact portion. For simplicity, FIG. 14 shows the transition of the potential of each component when the drum surface potential of the developing contact portion uniquely switches from −800V to 0V at the start of period 1 (t11), when the developing voltage switches from −400V to 150V. In reality, however, the surface of the photosensitive drum may not switch at such a timing because it takes time for the potential to switch, the potential does not change to 0V just by contacting the developing roller 31 and photosensitive drum 1 once but needs to be contacted several times, and so on. For this reason, the surface potential of the drum before charging or after being charged and passing through the developing portion is smaller in absolute value than −800V, but not necessarily 0V. Here, the necessary condition in the developing portion is that the back contrast, which is the difference in potential between the surface potential of the photosensitive drum after charging and the developing voltage, should be properly formed. In other words, the surface potential at the developing contact portion does not need to be 0V. The back contrast is not limited to 150V and should be set appropriately. For simplicity of explanation, the surface potential of the photosensitive drum before charging is assumed to be 0V in the following description. The surface potential of the photosensitive drum after charging is smaller in absolute value due to the potential difference caused by the developing voltage and brush voltage. In other words, as described above, the drum surface potential changes to the positive side while approaching 0V. Furthermore, as a result of the positive change, the surface potential of the drum in contact with the charging roller 2 just before the charging voltage is switched at timing t13 should be more positive than the common brush/developing voltage in period 4.

(Period 2)

Period 2 from timing t12 to timing t13 is the period from the moment the boundary between −800V and 0 of the drum surface potential reaches the brush member 11 until the charging voltage is switched from 0V to −1300V. In other words, timing t12 is the moment when the boundary between −800V and 0V of the drum surface potential reaches the brush member 11, which is indicated by the double-dotted chain line. The charging voltage is switched after the drum surface potential in contact with the charging roller 2 changes to the positive side of the common brush/developing voltage in period 4, which is described later.

FIG. 14 shows the transition of the potential of each member when the drum surface potential of the developing contacting portion switches from −800V to 0 at timing t11, which is the start of period 1. However, if the switching of the drum surface potential takes time in actual control, it is necessary to delay the switching of the charging potential at the end of period 2 and switch it after the drum surface potential of the portion in contact with the charging roller 2 changes to the positive side from the common brush/developer voltage in period 4. In Embodiment 3, as shown in FIG. 14, the case in which the drum surface potential of the developing contacting portion switches from −800V to 0V at the timing when the developing voltage switches from −400V to 150V is explained.

(Period 3)

The charging voltage is changed from 0V to −1300V at timing t13, which is the end of period 2, and the drum surface potential is charged from 0V to −800V at the portion in contact with the charging roller 2. The period from the charging voltage switch to timing t14, when the boundary between 0V and −800V of the drum surface potential reaches the developing portion, is defined as period 3.

(Period 4)

Period 4 from timing t14 to timing t15 is the period from when the boundary between 0V and −800V of the drum surface potential reaches the developing portion until this boundary reaches the brush member 11. The solid arrow indicates that the boundary portion of the drum surface potential due to the switching of charging voltage at timing t13 reaches the developing portion at timing t14. At timing t14, just after the start of period 4, the brush/developer common voltage is switched from 150V to −400V. In period 4, the relationship between the drum surface potential of the portion contacting the brush member 11 and the brush voltage is as shown in FIG. 12 (*b*), i.e., the absolute value of the brush voltage (|−400|V) is greater than the absolute value of the drum potential (|0|V). As a result, the negative toner accumulated on the brush member 11 is discharged onto the photosensitive drum 1. Here, when a brush voltage with the same polarity as the normal polarity of the toner is applied to the brush voltage, if the absolute value of the drum potential is smaller than the absolute value of the brush voltage, the negative toner is discharged onto the photosensitive drum 1. Therefore, the voltage required as the brush voltage is set appropriately according to the surface potential of the photosensitive drum. In other words, as mentioned above, the surface potential of the photosensitive drum does not have to be 0V. The negative toner accumulated on the brush member 11 should be set so that it is discharged onto the photosensitive drum 1. Period 4 of FIG. 14 (*vi*) shows an image indicating that the negative toner is discharged onto the photosensitive drum 1. On the other hand, the developing voltage is −400V at the developing roller 31, while the surface of the photosensitive drum is −800V at the portion of the drum in contact with the developing roller 31, so the negative toner, which is of the regular polarity, is never developed on the photosensitive drum 1.

(Period 5)

Period 5 after timing t15 is the period after the boundary between 0V and −800V of the drum surface potential reaches the brush member 11. In other words, timing t15 is the timing when the boundary between 0V and −800V of the drum surface potential has reached the brush member 11, which is indicated by the double-dotted chain line that has moved to the brush member 11. Since the drum surface potential (−800V) of the brush contact area becomes more negative than the brush voltage (−400V), the negative toner discharging from the brush member 11 onto the photosensitive drum 1 is completed. In Period 4, the surface of the photosensitive drum 1 from which the negative toner has been discharged from the brush member 11 (hereinafter referred to as the "drum surface") passes through the brush contacting portion, contacts the charging roller 2, and then enters the developing contacting portion. After timing t13, when period 3 begins, a charging voltage of −1300V is applied to the charging roller 2. Therefore, the drum surface from which the negative toner has been discharged is charged to −800V by contacting the charging roller 2. When this surface comes into contact with the developing roller 31 to which a voltage of −400V is applied, the negative toner is collected on the developing roller 31 side due to the potential difference between the photosensitive drum 1 and the developing roller 31. Period 5 in FIG. 14 (*v*) shows an image illustrating that the negative toner is collected on the developing roller 31. After sufficient toner is collected in period 5, the application of voltage to each member and the operation of the drive system are terminated.

In Embodiment 3, for simplicity, the charging voltage is changed and the developing voltage is also changed at timing t11, when switching from image forming to post-rotation operation, but this is not limited to this. For example, the charging voltage and the developing voltage may be changed in steps, respectively. By doing so, the potential difference between the drum potential of the developing contacting portion and the developing roller 31 may be controlled within a certain range to suppress the phenomenon of toner charged with positive polarity being discharged from the developing roller 31 onto the photosensitive drum 1.

Although Embodiment 3 assumes an image forming apparatus in which the photosensitive drum 1 and developing roller 31 are always in contact with each other during driving of the image forming apparatus, the same control can be applied to an image forming apparatus equipped with a contact separation mechanism that can arbitrarily separate these two portions. In this case, the photosensitive drum 1 and developing roller 31 should be separated from each other from period 1 to period 4 in FIG. 14, and then brought into contact with each other in period 5. This has the effect of discharging toner from the brush member 11 onto the photosensitive drum 1 in period 4 and collecting toner with the developing roller 31 in period 5, and also prevents fogging toner from being discharged from the developing roller 31 onto the photosensitive drum 1 during periods 1 to 4. The control portion 200 may keep the developing roller 31 in contact with the photosensitive drum 1 while the image forming apparatus is in operation.

In Embodiment 3, the drum surface potential was varied by controlling the developing voltage applied to the developing roller 31 at the end of the developing roller operation, but this is not limited to this. For example, an exposure unit for the photosensitive drum 1 may be installed downstream of the brush member 11 and upstream of the charging roller 2 in the rotation direction of the photosensitive drum 1 to change the potential of the surface of the photosensitive drum from −800V to 0V.

In FIG. 14, the control of the outer part (area A) from the transfer roller 5, where the transfer roller 5 has no effect on the drum surface potential, is described, but is not limited to this area. In the portion with the transfer roller 5, the drum surface potential after passing through the transfer portion can be adjusted by arbitrarily changing the voltage applied to the transfer roller 5. For example, if the transfer voltage is set to the same potential as the surface of the photosensitive drum 1 opposing roller, the same operation as in FIG. 14 can be performed in the portion with the transfer roller 5.

Figure 15:
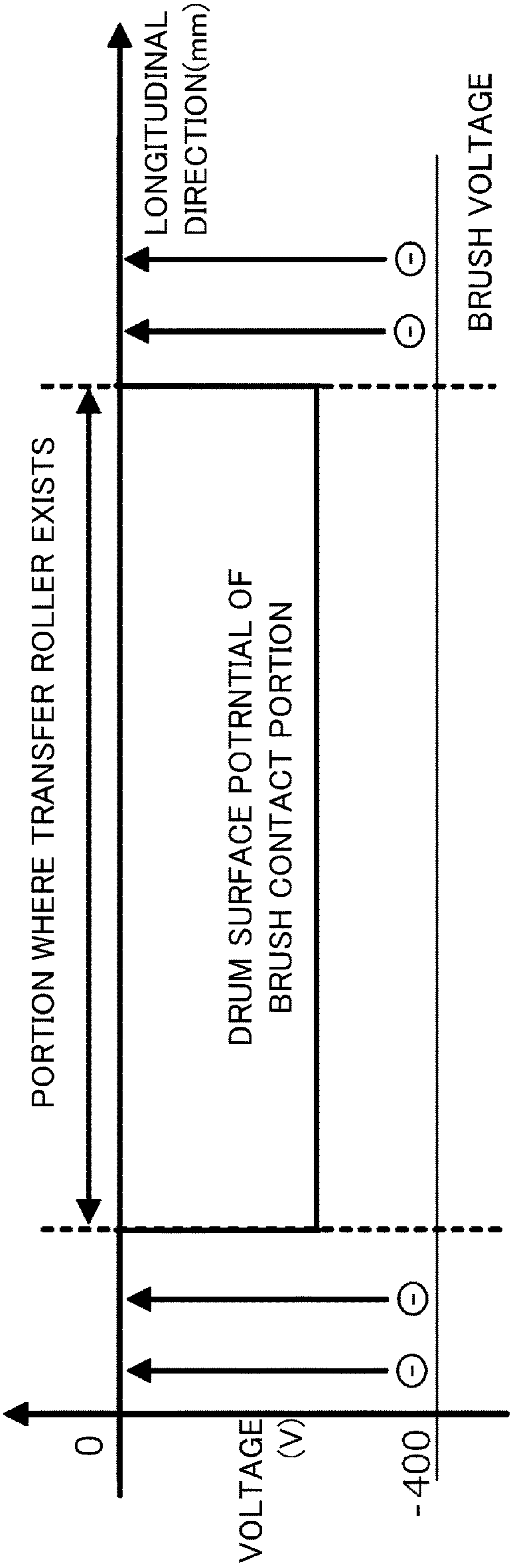
FIG. 15 is a drawing of the relationship between the brush voltage and the drum surface potential at the brush contact area in Embodiment 3.

For example, when a negative voltage is applied to the transfer roller 5, the drum surface potential after passing through the transfer portion in the area where the transfer roller 5 exists in the longitudinal direction is charged to the negative side compared to the portion without the transfer roller 5. FIG. 15 shows the brush voltage at the brush member 11 and the drum surface potential at the portion in contact with the brush member 11 during period 4 when a negative voltage is applied to the transfer roller 5 in addition to the control shown in FIG. 14. In FIG. 15, the horizontal axis indicates the coordinate (position) extending in the longitudinal direction, and the vertical axis indicates the brush voltage and drum surface potential at that coordinate (position). In the area where the transfer roller 5 is not present, the brush voltage is −400V and the drum surface potential is 0V, the same as the voltage in period 4 of FIG. 14. In contrast, in the portion where the transfer roller 5 is present (with transfer roller), the drum surface potential in the brush contact portion is charged to the negative side.

As described above, the control unit 200 controls the charging high voltage power supply 210 and the developing high voltage power supply 220 so that the developer collected by the brush member 11 moves from the brush member 11 to the surface of the photosensitive drum 1 in the first contacting portion where the brush member 11 contacts the photosensitive drum 1. The control portion 200 controls the charging high voltage power supply 210 and the developing high voltage power supply portion 220 so that the developer on the surface of the photosensitive drum 1 is collected from the surface of the photosensitive drum 1 through the developing roller 31 into the developer compartment 33 at the second contacting portion where the developing roller 31 and the photosensitive drum 1 contact each other. The control portion 200 performs such brush cleaning control. The developer moved to the photosensitive drum 1 surface moves from the photosensitive drum 1 surface to the developing roller 31 because the drum potential is at the first potential in the second contacting portion and the developing voltage is at the third voltage.

More precisely, the control portion 200 switches the charging portion from the first voltage (−1300V) to the second voltage (0V), which has a smaller absolute value than the first voltage, to change the drum potential from the first potential (−800V) to the second potential (0V) by switching from the first potential (−800V) to the second potential (0V). Along with this, the control portion 200 switches the brush voltage, which is the developing voltage and contact portion, from the third voltage (−400V) to the fourth voltage (150V), which has a smaller absolute value than the third voltage. After the first boundary portion, which changes from the first potential to the second potential on the photosensitive drum 1 due to the rotation of the photosensitive drum 1, reaches the first contact portion, the control unit 200 returns the drum potential from the second potential to the first potential by returning the charging voltage from the second voltage to the first voltage. The control portion 200 moves the developer from the brush member 11 to the photosensitive drum 1 surface by returning the developing voltage and brush voltage from the fourth voltage to the third voltage after the first boundary portion reaches the second contacting portion.

The transfer of the developer from the brush member 11 to the surface of the photosensitive drum 1 is completed when the second boundary, which changes from the second potential to the first potential on the photosensitive drum 1 due to the rotation of the photosensitive drum 1, reaches the first contacting portion. The first voltage is the charging voltage when image formation takes place, and the third voltage is the developing voltage and brush voltage when image formation takes place. In Embodiment 3, the brush cleaning control is performed after image forming control on the recording material S is performed. The length of the transfer roller 5 in the longitudinal direction, which is a direction perpendicular to the rotation direction, is shorter than the width of the recording material (e.g., letter size paper) with the longest width, which is the length in the longitudinal direction, of the recording materials on which image forming can be performed in the image forming apparatus.

Action of Embodiment 3

As mentioned above, when the drum surface potential is varied using members in contact with the photosensitive drum 1, the boundary of the drum surface potential rushes into contact with each member with a time difference as the photosensitive drum 1 rotates. By utilizing this, a period of time (period 4) is established during which the drum surface potential of the brush contacting portion and the drum surface potential of the developing portion are different. In this case, the drum surface potential of the brush contacting portion should be positive when the regular polarity of the toner is negative and negative when the regular polarity of the toner is positive, compared to the drum surface potential of the developing portion. Furthermore, during this period (period 4), the brush/developer common voltage is set to be the voltage between the drum surface potential of the brush contacting portion and the drum surface potential of the developing portion. This causes the brush member 11 to discharge the toner charged with the regular polarity onto the photosensitive drum 1. On the other hand, a large amount of regularly charged toner on the developing roller 31 is not developed on the photosensitive drum 1 in the developing contacting portion. The toner discharged from the brush member 11 onto the photosensitive drum 1 is collected in the developing portion, thereby completing the cleaning of the brush member 11.

Effect Description

The following is a description of the results of a paper-feeding test conducted to confirm the effectiveness of Embodiment 3. The paper-feeding test was conducted under the following conditions. First, the length of the transfer roller 5 is trimmed in the longitudinal direction so that it is shorter than the width of the recording material S to be fed. This is a procedure to confirm the effect of the brush cleaning control of Embodiment 3 on the area A in the brush member 11 that is outside the width of the transfer roller 5 and in which the cleaning control using the transfer roller 5 does not work.

Xerox Vitality Multipurpose Printer Paper (trade mark, basis weight 75 g) manufactured by Xerox was used as the recording material S under a temperature of 32.5° C. and relative humidity of 80% (high temperature and high humidity environment). Ten consecutive sheets were printed on the recording material S, forming a horizontal line image (an image with a 0.254 mm wide horizontal line and a 25.146 mm wide blank space repeated). The cleaning operation shown in FIG. 14 was then repeated five times.

The charging voltage during paper feeding in Embodiment 3 is normally −1300V, but in this consecutive 10-sheet feeding, it was set to −930V. This is to supply a large amount of fogging toner to the brush member 11 by bringing the drum surface potential after passing through the charging roller 2 close to the developing voltage. The fogging toner is generated by supplying toner from the developing roller 31 also to the non-image forming portions on the photosensitive drum 1 (the blank areas in the margins and horizontal line images). When the charging voltage is −1300V, the drum surface potential after passing through the charging roller 2 is −800V, whereas when the charging voltage is −930V, the drum surface potential after passing through the charging roller 2 is −430V. The developing voltage was set at −400V. When the charging voltage is −1300 V, the potential difference between the surface of the photosensitive drum and the developing voltage is 400V. Due to this potential difference, the negative toner, which is regular charging polarity, receives a force in the direction of being pushed from the photosensitive drum 1 to the developing roller 31. On the other hand, even when the charging voltage is set to −930V, the potential difference between the surface of the photosensitive drum and the developing voltage is 40V, and the negative toner receives a force from the photosensitive drum 1 in the direction of being pushed toward the developing roller 31. However, when the charging voltage is set at −930V, the potential difference is smaller and the negative toner receives less force than when the regular charging voltage of −1300V is applied. In addition to these conditions, a preparation operation was also prepared for comparison, in which no cleaning operation was performed after 10 consecutive sheets of horizontal line images were passed through.

Figure 16:
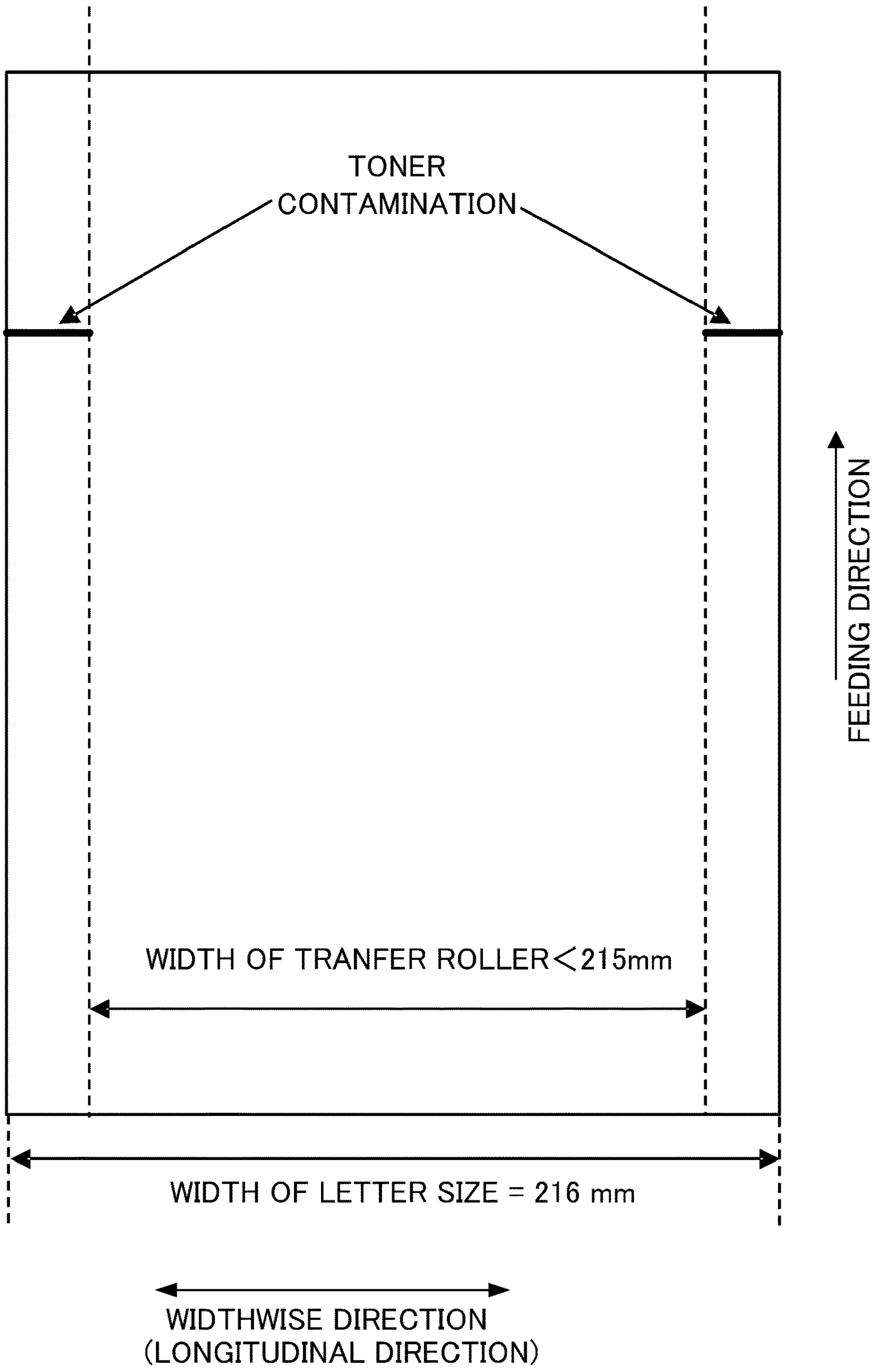
FIG. 16 is a drawing of the image defects caused by the cleaning defects in Embodiment 3.

Next, a single horizontal line image was fed through both with and without the brush cleaning operation. In this paper feeding, the charging voltage is set to −1300V. If toner stains occur in the area A from the leading end of the recording material S to the area around the length of one lap of the photosensitive drum 1 and outside the width of the truncated transfer roller 5 in the longitudinal direction, the brush cleaning is judged to be defective. A schematic drawing of a typical image of a cleaning defect is shown in FIG. 16. FIG. 16 also shows the width of the transfer roller 5 (less than 215 mm), the width of letter size paper (216 mm), the feeding direction of the recording material S and the width direction of each member. This toner stain is transferred onto the recording material S for the following reasons. Negative toner accumulates in the brush member 11 due to the continuous feeding of 10 sheets of recording material S with the charging voltage set to −930V. If the subsequent cleaning is not effective enough, the toner is discharged from the brush member 11 onto the photosensitive drum 1 in response to fluctuations in the drum surface potential caused by the recording material S rushing into the transfer nip portion.

The results of the paper feeding test are shown in Table 3.

TABLE 3

| | With cleaning | No cleaning |
|---|---|---|
| Cleaning defects | No | Yes |

Table 3 shows the occurrence of cleaning defects with and without cleaning, with "yes" when a cleaning defect occurred and "no" when a cleaning defect did not occur. No cleaning defects were observed in the case with the cleaning operation in Embodiment 3, whereas cleaning defects occurred without the cleaning operation.

Based on this result, the brush cleaning operation of Embodiment 3 discharges toner charged with regular polarity from the brush member 11 onto the photosensitive drum 1, while a large amount of toner charged with regular polarity on the developing roller 31 is prevented from developing on the drum 1 in the developing contacting portion. This allows the brush member 11 to be cleaned regardless of the presence or absence of the transfer roller 5 in the width direction. As a result, it was found that even at the edge of the brush member 11, which is not cleaned by the transfer roller 5, it is possible to suppress the discharging of toner and the associated occurrence of image defects.

According to the above Embodiment 3, it is possible to reduce the size and cost of cleaner-less image forming apparatus while reducing the occurrence of image defects caused by the cleaning brushes.

Next, Embodiment 4 is explained. The basic configuration and operation of the image forming apparatus according to Embodiment 4 are the same as those of the image forming apparatus according to Embodiment 3. Therefore, elements of the image forming apparatus in Embodiment 4 that have the same functions or configuration as those of the image forming apparatus in Embodiment 3 will be labeled with the same symbols as those of the image forming apparatus in Embodiment 3, and detailed explanations will be omitted.

Brush Cleaning Control in Embodiment 4

The control of the various types of potential control in Embodiment 4 is described below. The brush cleaning control in Embodiment 4 is also performed by the control portion 200 controlling each of the above-mentioned applying means. In Embodiment 3, after the end of the image forming operation, the post-rotation operation (period 1 to period 5) shown in FIG. 14 is performed and the drive system operation is terminated. In the control as shown in Embodiment 3, when paper is continuously fed, the brush member 11 is not cleaned from the start of feeding until all the feeding is completed. Therefore, when a large amount of paper is continuously fed, toner may accumulate in the brush member 11.

In Embodiment 4, brush cleaning is performed after a certain number of sheets have been fed and before the next sheet of paper is fed (hereinafter referred to as "paper interval"). Specific control examples are explained below. In Embodiment 4, the brush cleaning operation shown in FIG. 14, periods 1 through 5, is performed in the interval between sheets of paper during continuous paper feeding. Here, the paper interval refers to the space between the trailing end of the first recording material and the leading end of the second recording material when the second recording material is fed immediately after the first recording material and image formation is continuously performed. The paper interval may also be between the trailing end of the first toner image transferred to the first recording material and the leading end of the second toner image transferred to the second recording material. As shown in FIG. 14, in period 5, the charging voltage, brush/developer common voltage, and drum surface potential at any position are the same as during the image forming operation. Therefore, the subsequent paper can be continuously fed from period 5 to form an image on the subsequent recording material S. In other words, the control portion 200 performs the next paper feeding without stopping the operation of the driving portion after the brush cleaning operation. For example, the brush cleaning operation may be performed between each paper feed, or it may be performed every predetermined number of sheets, e.g., once per five sheets fed. The control portion 200 is supposed to keep track of the number of sheets of recording material S fed.

In this type of operation, note the length of period 5. As explained in Embodiment 3, the toner discharged from the brush member 11 onto the photosensitive drum 1 in period 4 is collected via the developing roller 31 as soon as it reaches the developing portion. If the next image forming operation is started before this collection operation is completed, the toner remaining on the photosensitive drum 1 may be transferred onto the recording material S, resulting in an image defect. To suppress this, the control portion 200 continues the period 5 until the toner discharged from the brush member 11 is collected before starting the image forming portion.

Action of Embodiment 4

As described above, by performing the brush cleaning operation between sheets of paper, the brush can be cleaned frequently even when continuous feeding is performed, and toner accumulation in the brush member 11 can be suppressed. In Embodiment 4, for example, the brush cleaning operation is performed once per 5 sheets of paper, but this is not limited to this frequency. The frequency of performing the brush cleaning operation during continuous image formation can be selected, for example, as follows. That is, the appropriate number of sheets can be selected by taking into consideration factors such as the degree of toner accumulation in the brush member 11 due to continuous paper feeding, the frequency of image defects caused by the toner accumulation, and the longer paper feeding time due to the brush cleaning operation.

Thus, in Embodiment 4, the brush cleaning control is performed between the end of image forming on the first recording material and the start of image forming on the second recording material that is being fed following the first recording material when image forming is performed continuously. The control portion 200 executes the brush cleaning control every time a predetermined number of images are formed in a continuous image forming operation.

According to the above Embodiment 4, the occurrence of image defects caused by the cleaning brushes can be reduced while achieving downsizing and cost reduction in a cleanerless image forming apparatus.

Embodiment 5 is described below. The basic configuration and operation of the image forming apparatus according to Embodiment 5 are the same as those of the image forming apparatus according to Embodiment 3. Therefore, elements of the image forming apparatus of Embodiment 5 that have the same functions or configuration as those of the image forming apparatus of Embodiment 3 are marked with the same symbols as those of the image forming apparatus of Embodiment 3, and detailed explanations are omitted.

Brush Cleaning Control in Embodiment 5

Figure 17:
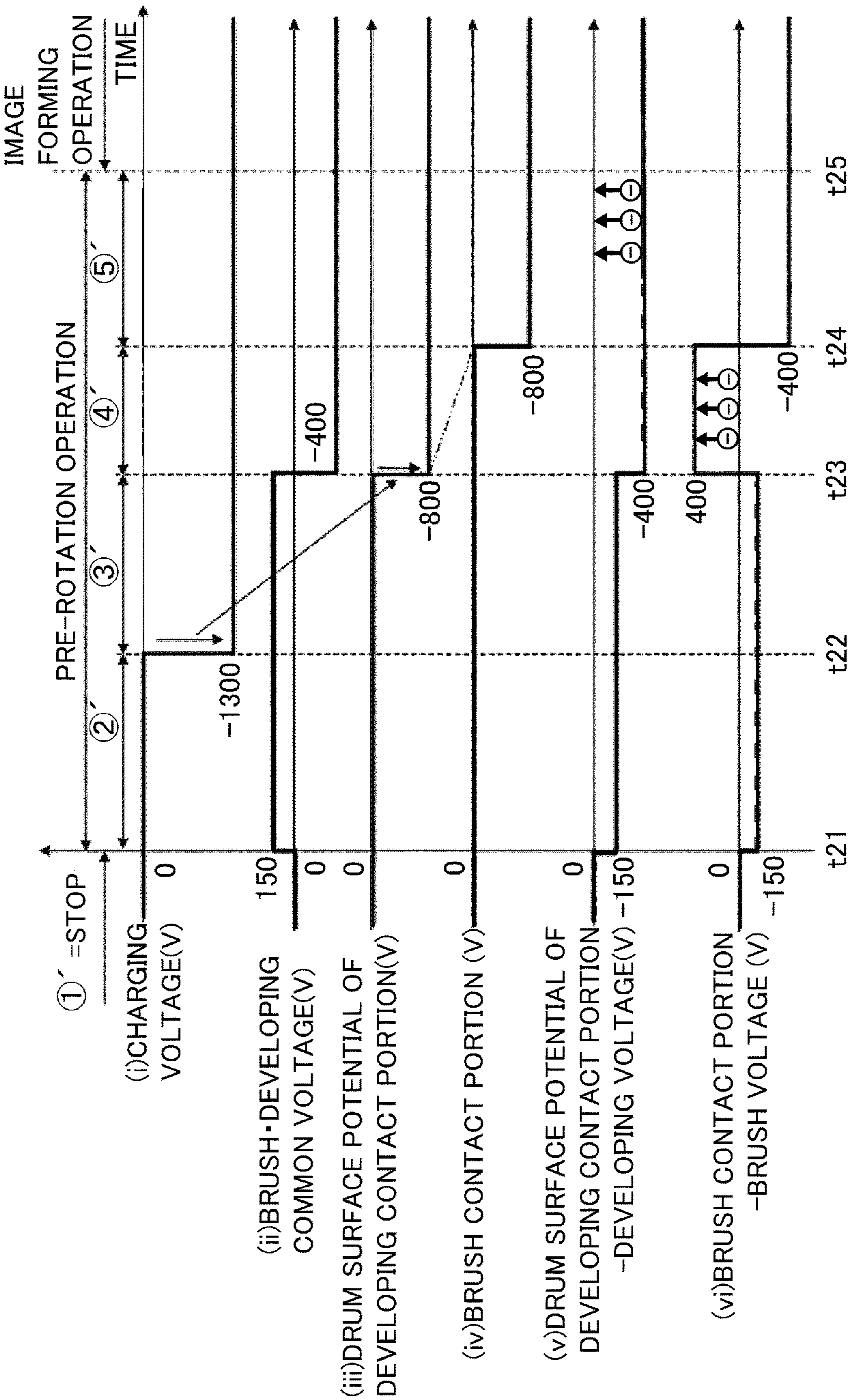
FIG. 17 is a drawing of the brush cleaning control in Embodiment 5.

Embodiment 5 performs a brush cleaning operation as a preparation operation before starting the image forming operation (hereinafter referred to as "pre-rotation operation"). The control of various types of potential control in Embodiment 5 is explained using FIG. 17. FIG. 17 shows the image forming operation after the pre-rotation operation from the time of shutdown until timing t21 to timing t25, when the image forming operation is started, in the image forming apparatus in Embodiment 5. FIGS. 17 (*i*) to 17 (*vi*) are the same graphs as FIGS. 14 (*i*) to 14 (*iv*). The horizontal axis shows time, and the vertical axis shows the applied voltage to each member, the drum surface potential of the brush contacting portion and developing portion, the drum surface potential of the brush contacting portion in relation to the brush voltage, and the drum surface potential of the developing portion in relation to the developing voltage. The stopping time up to timing t21 is designated as period 1', and the periods are divided along the time series by the timing of switching the voltage applied to each member and the timing of switching the drum surface potential, in turn, from period 1' to period 5'.

(Periods 2' Through 5')

In periods 2' through 5', the operations are the same as those of periods 2 through 5 in Embodiment 3, respectively, so a detailed explanation is omitted. As in Embodiment 3, the toner retained in the brush member 11 is discharged onto the photosensitive drum 1 in period 4', and the discharged toner is collected by the developing roller 31 in period 5'.

(Period 1')

Period 1' represents the stop time. No voltage is applied to each member (0V), and the surface potential of the photosensitive drum 1 is 0V. At timing t21 of switching from period 1' to period 2', the drive system is started up. Furthermore, the brush/developer common voltage is switched from 0V to 150V. A potential difference is formed between the photosensitive drum 1 and the developing roller 31 in the developing portion such that the toner charged with regular charging polarity is pushed from the photosensitive drum 1 to the developing roller 31. This prevents the regular charging polarity charged toner, which accounts for a large portion of the toner present on the developing roller 31, from adhering to the photosensitive drum 1.

(Period 5')

In period 5' from timing t24 to timing t25, the potential of each member and the drum surface potential are the same as during the image forming operation. After the end of period 5' at timing t25, the process is shifted to continuous image forming operation. The period 5' is a period for collecting the toner discharged from the brush member 11. Therefore, the control portion 200 must continue the period 5' until the toner collection is completed before shifting to the image forming operation. Thus, in Embodiment 5, the brush cleaning control is performed before image forming is performed on the recording material S.

Action of Embodiment 5

As described in Embodiment 3, toner is supplied from the developer compartment 33 to the developing roller 31 by the toner supplying roller 32, and is charged to a predetermined polarity (for example, negative polarity, which is the regular charging polarity in Embodiment 5) as it passes through the contact portion with the developing blade 34. However, when the image forming operation is completed and the image forming apparatus is stopped, the charge that the toner has decays with the passage of time. If the image forming apparatus is started up while the toner does not have sufficient charge, the following occurs. That is, the toner that was present on the developing roller 31 in the area extending from the developing blade 34 to the photosensitive drum 1 along the driving direction (rotation direction) contacts the photosensitive drum 1 without passing through the contact portion with the developing blade 34. Such toner is insufficiently charged. Even if a potential relationship is formed such that toner charged with regular polarity is pressed from the photosensitive drum 1 to the developing roller 31 in the contact portion with the developing roller 31 in the photosensitive drum 1, a certain amount of toner may be transferred from the developing roller 31 onto the photosensitive drum 1. This may also occur even if the potential relationship is such that toner charged in the regular polarity is pressed against the photosensitive drum 1 in the opposite direction. Such toner is called startup fogging toner. By performing the brush cleaning operation during the prerotation operation, brushes contaminated by startup fogging toner can be cleaned.

According to the above Embodiment 5, the occurrence of image defects caused by the cleaning brushes can be reduced while achieving downsizing and cost reduction in a cleanerless image forming apparatus.

In Embodiments 5 through 5, the surface potential of the photosensitive drum 1 in the first contacting portion of the section where the toner retained in the brush member 11 is discharged from the brush member 11 onto the surface of the photosensitive drum 1 is controlled to a predetermined potential. The predetermined potential is controlled by controlling at least one of the charging high voltage power source 210, developing high voltage power source 220, and light intensity of exposure unit 4 during that section. However, it is not limited to these.

For example, a pre-exposure portion (not shown), which is a pre-exposure means to equalize the potential of the surface of the photosensitive drum 1, may be provided downstream from the first contacting portion and upstream from the charging portion. In this case, the potential of the surface of the photosensitive drum 1 at the first contacting portion in that section may be controlled to a predetermined potential by controlling at least one of the charging high voltage power source 210, developing high voltage power source 220, pre-exposure unit, and light intensity of the exposure unit 4 during that section.

The present invention can reduce the size and cost of cleaner-less image forming apparatus while reducing the occurrence of image defects caused by cleaning brushes.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications Nos. 2021-204609 filed Dec. 16, 2021 and 2021-206397 filed Dec. 20, 2021, which are hereby incorporated by reference herein in its entirety.

What is claimed is:

1. An image forming apparatus comprising:

an image bearing member;

a charging means configured to electrically charge a surface of the image bearing member at a charging portion;

an exposing means configured to expose a surface of the image bearing member to light to form an electrostatic latent image on the surface of the image bearing member electrically charged by the charging means;

a developing means configured to develop the electrostatic latent image formed on the surface of the image bearing member with a developer and to form a developer image;

an accommodating portion configured to accommodate the developer to be supplied to the developing means;

a transfer means configured to transfer the developer image formed by the developing means to a recording material in a transfer portion;

a contacting member provided upstream of the charging portion and downstream of the transfer position with respect to a rotational direction of the image bearing member and contacting the surface of the image bearing member in a first contacting portion;

a first applying means configured to apply a charging voltage to the charging means;

a second applying means configured to apply a developing voltage to the developing means;

a third applying means configured to apply a contacting voltage to the contacting member;

a pre-exposing means configured to expose the surface of the image bearing member downstream of the first contacting portion and upstream of the charging portion; and a control means configured to control to collect the toner remaining on the image bearing member without being transferred to the recording material by the transferring means to the accommodating portion via the developing means by controlling the developing voltage applied by the second applying means;

wherein a section in which a potential difference is formed to generate electrostatic force which moves the developer charged with a normal polarity in the first contacting portion from the contacting member toward the image bearing member is provided during an operation of non-image formation, and wherein until an area of the image bearing member which forms the first contacting portion in the section moves to a second contacting portion by rotating the image bearing member, the control means controls to switch the surface potential to be formed in the area so that a potential difference is formed to generate electrostatic force which moves the developer charged with the normal polarity from the image bearing member toward the developing means.

2. An image forming apparatus according to claim 1, wherein the second applying means and the third applying means are a common power supply source.

3. An image forming apparatus according to claim 1, wherein a collection of the developer is executed before image formation to the recording material and after the image formation to the recording material, or from when the image formation to the first recording material has been terminated until the image formation to a second recording material to be conveyed following the first recording material is started in a case in which continuous image formation is performed.

4. An image forming apparatus according to claim 3, wherein the control means executes the collection of the developer for each image formation of a predetermined number of recording materials in the case in which the continuous image formation is performed.

5. An image forming apparatus according to claim 1, wherein a length of the transfer means in a longitudinal direction perpendicular to the rotational direction is shorter than a width of a recoding material of which the width in the longitudinal direction is longest of recording materials to which the image forming apparatus is capable of performing the image formation.

6. An image forming apparatus according to claim 1, wherein the developing means is in contact with the image bearing member during an operation of the image forming apparatus.

7. An image forming apparatus according to claim 1, wherein the control means controls the surface potential of the image bearing member in the first contacting portion of the section to a predetermined potential by controlling at least one of the charging voltage of the first applying means, the developing voltage of the second applying means and a light quantity of the exposing means during the section.

8. An image forming apparatus according to claim 7, wherein the control means controls the surface potential of the image bearing member in the first contacting portion of the section to a predetermined potential by controlling at least one of the charging voltage of the first applying means, the developing voltage of the second applying means, a light quantity of the pre-exposing means, and a light quantity of the exposing means during the section.

9. An image forming apparatus according to claim 1, wherein the charging member electrically charges the surface of the image bearing member by contacting the surface of the image bearing member.

10. An image forming apparatus according to claim 1, wherein the contacting member includes a brush collecting a paper powder deposited on the surface of the image bearing member, wherein the brush is provided with base materials contacting the surface of the image bearing member, and wherein a density of the base materials of the brush is 120 $kF/inch^2$ or more.

11. The image forming apparatus according to claim 1, wherein, in an axial direction of the developing member, the length of the contacting member is longer than the length of the developing member, and the first end of the contacting member is located outside the first end of the developing member.

* * * * *